(12) United States Patent
Tuminaro

(10) Patent No.: US 6,577,795 B2
(45) Date of Patent: Jun. 10, 2003

(54) DEVICE AND METHOD FOR IMPROVED LONG TERM SIGNAL ATTENUATION PERFORMANCE OF FIBER OPTIC CABLE AND APPARATUS INTERFACES

(75) Inventor: Raymond D. Tuminaro, Livingston, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/056,139
(22) Filed: Jan. 24, 2002

(65) Prior Publication Data
US 2002/0090183 A1 Jul. 11, 2002

Related U.S. Application Data

(62) Division of application No. 09/616,957, filed on Jul. 14, 2000.

(51) Int. Cl.[7] .................................................. G02B 6/44
(52) U.S. Cl. ....................................................... 385/102
(58) Field of Search ................................. 385/102, 123, 385/126, 128; 65/60.1, 17.1, 435

(56) References Cited

U.S. PATENT DOCUMENTS

| 3,791,714 | A | 2/1974 | Maurer | 350/96 |
|---|---|---|---|---|
| RE28,029 | E | 6/1974 | Keck et al. | 65/3 |
| 3,877,912 | A | 4/1975 | Shiraishi et al. | 65/3 |

(List continued on next page.)

FOREIGN PATENT DOCUMENTS

| DE | 3104041 | 8/1982 | G02B/5/14 |
|---|---|---|---|
| DE | 231141 | 12/1985 | G02B/6/00 |
| GB | 2149392 | 6/1985 | C03C/23/00 |
| JP | 03158807 | 7/1991 | G02B/6/44 |
| JP | 10167770 | 6/1998 | C03C/25/02 |

OTHER PUBLICATIONS

Raymond D. Tuminaro, "Materials Aspects of the SL Lightguide Undersea Cable Design", 1988 MRS Spring Meeting Plenary Address, MRS Bulletin, Jul. 1988, pp. 14–22.

*Primary Examiner*—Khiem Nguyen

(57) ABSTRACT

The present invention is directed to a method and apparatus for improved long term signal attenuation performance of fiber optic cable and cable and/or fiber interface components. The improved long term signal attenuation performance of the fiber optic cable is achieved by introducing an additive that will occupy defect sites in the optical fibers, such as deuterium, into materials used in the fiber optic cable, either prior to or during the assembly process. The fiber optic cable casing structure then acts as a reaction chamber so that the additive which has been introduced during the fiber optic cable assembly process will react with the optical fibers so as to occupy defect site locations in the optical fibers. For example, the reaction of silica defect sites with deuterium improves the long term stability of the attenuation characteristics of the fiber optic cables because the number of defect sites available for hydrogen molecules to react with are reduced. According to one exemplary embodiment of the invention deuterium is introduced into a fill material used in the fiber optic cable. Further, the material into which deuterium is introduced may be an embedding material into which the optical fibers are embedded within the casing of the fiber optic cable. The deuterium may be introduced into the material by dissolving the deuterium into the material or bubbling the material with deuterium. In another exemplary embodiment of the invention, deuterium is introduced into a fiber optic apparatus housing, which contains fiber optic components, prior to sealing the housing. According to a still further exemplary embodiment of the invention, deuterium is introduced into the fiber optic cable by exposing the optical fibers to deuterium prior to assembling the optical fibers into a fiber optic cable.

5 Claims, 15 Drawing Sheets

U.S. PATENT DOCUMENTS

| | | |
|---|---|---|
| 3,933,454 A | 1/1976 | DeLuca .......................... 65/3 |
| 4,156,104 A | 5/1979 | Mondello ................ 174/70 R |
| 4,217,027 A | 8/1980 | MacChesney et al. ..... 350/96.3 |
| 4,282,196 A | 8/1981 | Kometani et al. .......... 423/337 |
| 4,389,230 A | 6/1983 | Modone et al. .............. 65/3.12 |
| 4,439,632 A | 3/1984 | Aloisio, Jr. et al. ..... 174/106 D |
| 4,477,298 A | 10/1984 | Bohannon, Jr. et al. ...... 156/54 |
| 4,515,612 A | 5/1985 | Burrus, Jr. et al. .......... 65/3.12 |
| 4,557,560 A | 12/1985 | Bohannon, Jr. et al. . 350/96.23 |
| 4,569,704 A | 2/1986 | Bohannon, Jr. et al. ...... 156/48 |
| 4,729,629 A | 3/1988 | Saito et al. .............. 350/96.23 |
| 5,176,854 A | 1/1993 | Ito et al. ..................... 252/582 |
| 5,901,264 A * | 5/1999 | Camlibel et al. ........... 385/128 |
| 5,930,431 A | 7/1999 | Lail et al. ................... 385/100 |
| 6,017,806 A | 1/2000 | Harvey ....................... 438/475 |
| 6,052,219 A | 4/2000 | Kidorf et al. ............... 359/334 |

\* cited by examiner

APPLICATION OF COPPER SHEATH OVER STRANDED WIRE PACKAGE

SETUP FOR DISSOLVING DEUTERIUM IN THE FILL MATERIAL

FIG. 14 SETUP FOR FOAMING FILL MATERIAL WITH DEUTERIUM

DEVICE AND METHOD FOR IMPROVED LONG TERM SIGNAL ATTENUATION PERFORMANCE OF FIBER OPTIC CABLE AND APPARATUS INTERFACES

CROSS REFERENCE TO RELATED APPLICATIONS

The present application is a divisional and claims priority to commonly assigned patent application entitled "Device and Method for Improved Long Term Signal Attenuation Performance of Fiber Optic Cable and Apparatus Interfaces, application Ser. No. 09/616,957; the contents of which are herein incorporated by reference.

FIELD OF THE INVENTION

The present invention relates to fiber optic cables and apparatus used for broadband communications, and more particularly, to providing a fiber optic transmission systems and cables which have improved lifetime attenuation performance.

BACKGROUND OF THE INVENTION

Recently fiber optic transmission has become a preferred method of providing broadband communications because of its extremely low attenuation and large available bandwidth for providing advanced digital communications. In long distance transmission applications individual optical fibers are typically bundled together to form fiber optic cables; these cables usually interface with repeaters at periodic intervals so that the optical signals carried by the fibers can be restored to their desired levels after having suffered attenuation over long propagation distances. Further, the optical transmission path may include optical filters to shape and flatten composite signal response. Often the individual fibers carry multiple independent channels through the use of, for example, dense wavelength division multiplexing (DWDM) technology, with each of the channels occupying a sub-band contained within the main transmission band. The gain vs. wavelength responses of the amplifiers contained within the repeaters are typically quite sensitive to small (age-induced) changes in input signal levels. These changes in input signal levels are most often due to age-related attenuation changes in the cabled fibers. It is for this reason that the current invention is aimed at minimizing long-term, hydrogen-induced increases in attenuation that might otherwise occur.

The fiber optic cables referred to above may be used to transmit information for telephone, television and computer data in indoor and outdoor environments. These fiber optic cables are made in various configurations and designs. Some example of a few fiber optic cable designs are illustrated in U.S. Pat. Nos. 4,156,104, 5,930,431, 4,439,632, 4,477,298, 4,557,560, 4,569,704, 4,729,629 and the article by Raymond D. Tuminaro, *Materials Aspects of the SL Lightguide Undersea Cable Design*, MRS Bulletin, July 1988. Outside fiber optic cables may be used to span various types of geography and environments which may include terrestrial, subterranean, and submarine (e.g., undersea) applications.

Due to the cost of manufacturing and installing the fiber optic cables, it is desired that the useful life of the fiber optic cables be as long as possible, often times greater than 25 years. One of the characteristics which affects the useful life of fiber optic cables is age-dependent increases in attenuation of signals at wavelengths used for signal transmission (e.g., 1550 nm). Further, some of the characteristics which affect the usefulness of the fiber optic transmission cable systems in, for example, DWDM systems is the overall spectral response resulting from the combination of attenuation vs. wavelength response of the fibers and the gain vs. wavelength response of the amplifiers deployed along the cabled fiber transmission path. As noted above, changes in fiber attenuation give rise to changes in input levels to the amplifiers; optical amplifiers, such as those based on erbium-doped fibers, experience changes in their gain vs. wavelength responses when their input signals carried by the cabled fibers are changed. As greater bandwidth and more and more channels are carried by individual optical fibers, stability of the attenuation behavior of the fiber is an ever increasing concern. Hydrogen-induced increase in fiber attenuation over the lifetime of the system is one of the major causes for concern with respect to the composite amplifier plus fiber spectral response.

Extensive experience in the area of optical fiber cable design has shown that, while it is often possible to reduce the amount of hydrogen inside of fiber optic cables to very low levels (for example, much less than 0.01 atmosphere partial pressure), this small amount of residual hydrogen is capable of chemically reacting with the constituents of the optical fibers to a sufficient degree so as to cause a small, but measurable, increase in fiber attenuation, with an attendant degradation in the composite spectral response of the cable plus repeater iterative structure. Further, there is evidence that, as a result of some of the fiber optic cable designs and some of the environments in which fiber optic cables are installed, the amount of hydrogen in the core of optical fibers within the fiber optic cables may increase over time. Therefore, there is a need to provide an efficient and cost effective manner for reducing the fiber optic cable susceptibility to signal degradation which may be caused by hydrogen over time.

Analysis has shown that molecules of ordinary hydrogen (having individual atoms comprised of a single electron and single proton), can readily combine with the chemical constituents of optical fibers and give rise to resonant attenuation peaks, whose tails extend into the portion of the spectral band, or bands, used for the transmission of signals, thereby degrading signal transmission. Analysis has also shown that by introducing a common isotope of hydrogen, deuterium (with individual atoms comprised of an electron, a proton, and a neutron), into the process of forming individual optical fibers, the deuterium will combine with the constituents of optical fibers and give rise to resonant attenuation peaks; however, in the case of deuterium, these resonant peaks and their tails lie well outside the commonly used portion of the spectrum used for transmission, and are therefore non-degrading, or minimally degrading, to signal transmission.

SUMMARY OF THE INVENTION

The present invention is directed to a method and apparatus for improved long term signal attenuation performance of fiber optic cable and cable and/or fiber interface components. The improved long term signal attenuation performance of the fiber optic cable and apparatus is achieved by introducing an additive after the optical fibers and apparatus have been formed as part of, or precursor to, the cable and apparatus making process. For example, an additive such as deuterium, may be introduced before, during, or after the fiber optic cable or apparatus assembly process. The additive will react with and occupy available chemically active defect sites in the optical fibers and apparatus that might otherwise adversely react with ordinary hydrogen. In some preferred embodiments, deuterium may be introduced into the cabling process and/or components anywhere from the initial fiber or component storage and preparation process to the later processing stages in which optical fiber bundles are encased within the structural elements of the cable or components are deployed within an amplifier or repeater housing. The partial or complete fiber optic cable structure or apparatus housing may then act as a reaction chamber so that the additive which has been introduced during the fiber optic cable or apparatus assembly process will react with the optical fibers or components so as to occupy defect site locations in the optical fibers or fiber-interfacing components, and thereby make them unavailable for chemical combination with ordinary hydrogen. Alternatively, the deuterium may be introduced into the optical fibers just prior to forming a fiber optic cable and components or subsequent to forming the fiber optic cable and components, as long as the deuterium is made to react with available defect sites. In any case, the occupation of defect sites by deuterium reaction products improves the long term signal attenuation characteristics of the fiber optic cables and/or components because the number of defect sites that are available for chemical combination with ordinary hydrogen will have been reduced as a result of prior combinations with deuterium.

According to one exemplary embodiment of the invention deuterium is introduced into a fill material used in the fiber optic cable and/or apparatus. According to one variation of the invention, the fill material may be used as a water blocking material used to ensure liquid water or moisture does not rapidly migrate deep into the internal portions of the cables when the cable is ruptured or the cable ends are exposed to a water-rich surrounding environment, as might be the case if the fill material was not used. According to another variation of the invention, the material into which deuterium is introduced may be a material into which the optical fibers are embedded within the casing of the fiber optic cable. The deuterium may be introduced into the material by dissolving the deuterium into the material or bubbling the material with deuterium. Likewise, the deuterium may be introduced in the post-cured fiber embedding material or materials, while the material is in the post-cured or solidified state. In another exemplary embodiment of the invention, deuterium is introduced into a fiber optic apparatus housing, which contains fiber optic components, prior to sealing the housing.

According to another exemplary embodiment of the invention deuterium is introduced into the fiber optic cable by exposing the optical fibers to deuterium prior to assembling the optical fibers into a fiber optic cable; such exposure, carried out for a relatively short period of time at moderate temperature, results in deuterium molecules being diffused and dissolved into the doped silica optical fibers with or without chemically reacting with the optical fiber materials during this introductory phase. In one variation of the invention, optical fiber sets that are to be used in a fiber optic cable are immersed in a deuterium atmosphere after the optical fibers have been manufactured but prior to being embedded within a fiber optic cable. During the immersion period the deuterium diffuses into the optical fibers to create deuterium-loaded optical fibers.

In a variation of the invention, the optical fibers are placed in a pressure-sealed chamber with deuterium gas maintained at a predetermined temperature and partial pressure for a period of time. In another variation of the invention, the optical fibers are fed through a chamber including deuterium gas as the optical fibers are being fed into the fiber optic cable assembly process to be embedded in an embedding material. The optical fibers are exposed to the deuterium under processing conditions so as to diffuse a sufficient amount of deuterium into the optical fibers in anticipation of a later defect-site chemical reaction promoted by, for example, later cabling processing or storage conditions, or alternately by retaining the fibers in the deuterium immersion chamber at time and temperature conditions required to promote the desired level of defect site reactions. As noted earlier, deuterium-based chemical reaction at defect sites, which is relatively benign from a signal transmission point of view, will ensure that those same sites will not be available for the degrading reactions that might otherwise occur with ordinary hydrogen. The inclusion of this feature into cable manufacture will improve the long term stability of the signal attenuation performance of fiber optic cable.

Once deuterium is introduced at a process step, the following conditions may apply in order to suppress the chemical reactions that might otherwise occur in the presence of ordinary hydrogen. The post-deuterium introduction process conditions (temperature and time) are established such that a significant level of deuterium reaction can occur at the defect sites. As a result, deuterium reaction may occur prior to ordinary hydrogen ingress into fiber cores. Alternatively, the deuterium introduction process may be established so that the molecular density ratio of dissolved deuterium to dissolved hydrogen at the core regions of the optical fibers may be high, in order to increase the probability that some portion of active optical fiber defect sites combine with deuterium instead of ordinary hydrogen. The time of arrival of significant numbers of deuterium at the core regions of the fibers may precede, or be sufficiently coincident with, the time of arrival of significant numbers of ordinary hydrogen molecules. In the case that deuterium and hydrogen arrive at the core regions of the optical fibers at approximately the same time, the high population ratio of deuterium to ordinary hydrogen molecules will help ensure that at least some of the defect sites are occupied by deuterium reaction products.

In one variation of the invention, after deuterium is introduced into a material used in the construction of the fiber optic cable, a material which slows, reduces, or resists the rate of deuterium egress from the cable, or cable subassembly, may be used to ensure retention and diffusion of some of the deuterium into the optic fibers embedded within the fiber optic cable. In this case, during the cabling process and over time the deuterium retained within the fiber optic cable will, after diffusing into the fibers, react and combine with the defect sites in the optical fibers, lowering the probability that ordinary hydrogen can react with those same defect sites, and thereby improving the long term stability of the attenuation characteristics of the optical fibers and fiber optic cable.

DESCRIPTION OF THE PREFERRED EMBODIMENTS

The present invention is directed to a method and apparatus for improved long term signal attenuation performance of fiber optic cable by introducing deuterium into materials used in the fiber optic cable or apparatus, either just prior to or during the assembly process. The deuterium diffuses into the optical fibers and/or fiber optic-based components and reacts with the optical fiber material, for example silica, and dopants comprising the fiber at defect sites so that ordinary hydrogen has a low probability of subsequently reacting at those same defect sites. The fiber optic cable structure, or a sub-unit thereof, or component, amplifier, or repeater housing, may be itself the deuterium reaction chamber to facilitate the deuterium reacting with the optical fibers and/or fiber-based components, so as to occupy defect sites. Once reacted with the optical fiber material at defect sites, the deuterium reaction products serve to stabilize the long term signal attenuation characteristics of the fibers, or fiber-based components, by reducing the number of unreacted defect sites to which hydrogen molecules may subsequently react.

The present invention is useful in any type of fiber optic cable or fiber optic apparatus used for any type of environment. However, the present invention is particularly useful for fiber optic cables and apparatus that may experience exposure to increased amounts of hydrogen. These increased amounts of hydrogen may be experienced due to the design of the fiber optical cable or apparatus itself, the cable or apparatus manufacturing process, or the environment in which the fiber optic cable or apparatus is placed. For example, fiber optic cables may contain excessively high levels of internal moisture introduced during manufacture. This internal moisture, over a period of time, may corrode the metallic elements (for example, the strength wires); one of the by-products of this corrosion activity is hydrogen, which can readily diffuse into the optical fibers. Further, a fiber optic cable may be placed in a humid or wet geographical location such as a tropical rain forest or along the bottom of an ocean. If the cable is not sealed against moisture diffusion, moisture ingress will occur followed by corrosion activity, with hydrogen release, and diffusion of this hydrogen into the fibers may follow. In any case, the present invention will be explained using one type of undersea fiber optic cable and process for making that fiber optic cable, although it is understood that the invention is useful on other cable designs and types where the chemical reaction of hydrogen at defect sites may create long term attenuation changes.

Figure 1:
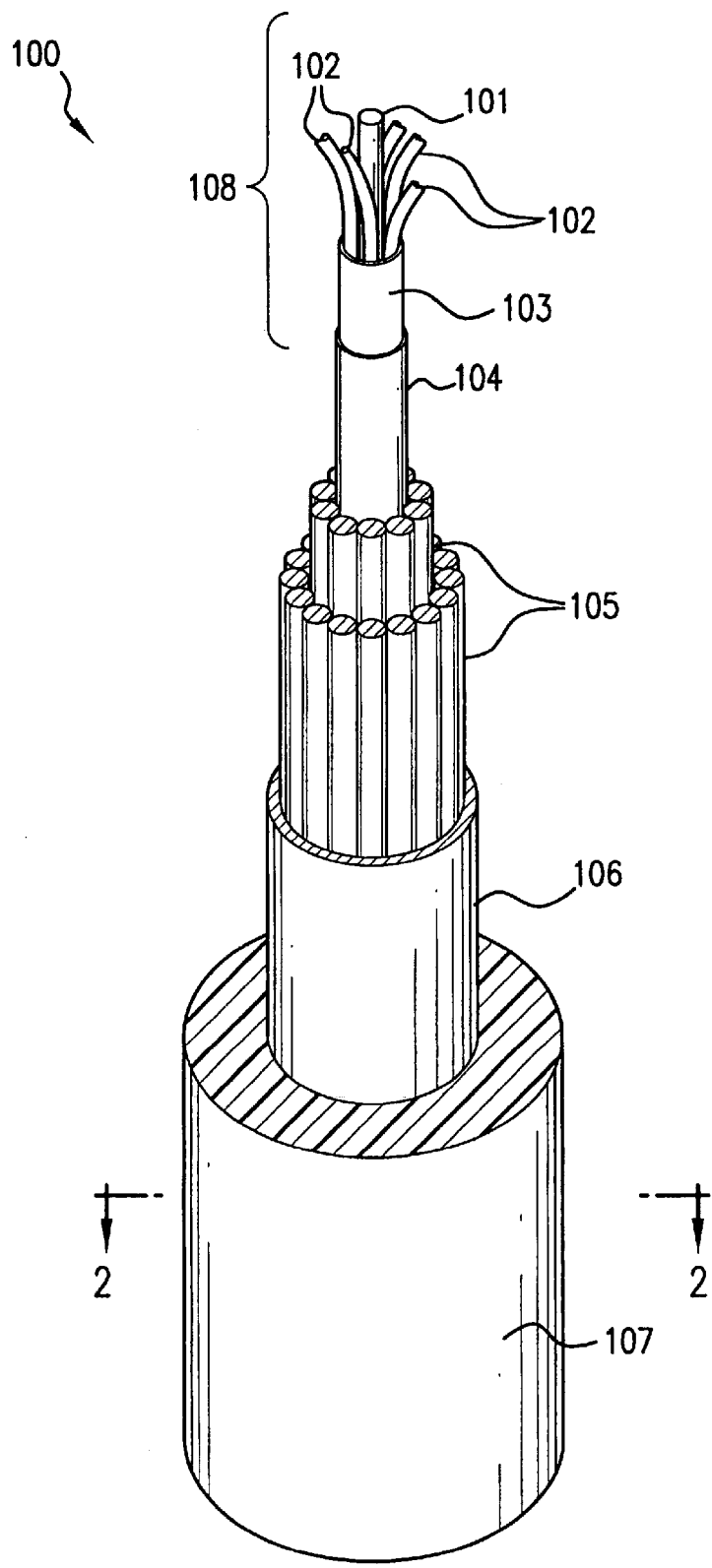
FIG. 1 shows a isometric view of one fiber optic cable in which the present invention may be included.

FIGS. 1–5 illustrate various fiber optic cables and cable subassemblies in which the present invention will be useful. The cables are used in, for example, undersea applications. Referring to FIG. 1, which shows a isometric view of a portion of one fiber optic cable 100 in which the present invention may be included, the cable 100 includes at its center a continuous wire 101, which serves as a base, or foundation, over which core 108 may be built. This core 108 is alternately designated as the Unit Fiber Structure (UFS) and remainder of the cable may be built. Wire 101 may be made of, for example, steel, copper-clad steel, or a non-metallic material. Optical fibers 102 run adjacent to wire 101, typically forming a helical path about the wire, and may be surrounded by embedding material 103. The embedding material may be, for example, an elastomer. The embedding material 103 may be encased in an optional outer jacket 104. The optional outer jacket 104 may be made of, for example, nylon, a polymeric material, metal, or a metallic coated material. The wire 101, optical fibers 102, embedding material 103, with or without the optional outer jacket 104, makes up a central portion, or core, of the fiber optic cable 100 and will be referred to herein as the unit fiber structure (UFS) 108.

The UFS 108 is surrounded by one or more layers of strength members 105. These members 105 may consist of high strength wire made of, for example, steel. The strength members 105 are then encased in a containment cylinder or sheath 106. The containment cylinder 106 may be made of, for example, a material including copper. A containment cylinder 106 may be continuously welded along its length so as to form a hermetic type seal. If the strength members 105 and the containment cylinder 106 are made of conductive materials (for example, steel, copper, etc.) they may in conjunction form an electrically conductive member of the fiber optic cable 100, which may serve as a path for electrically powering distant repeaters. A fill material (205 in FIG. 2) may be employed to fill any voids that may form between the various plurality of strength members 105 and voids between the strength members 105 and UFS 108, or between the strength members 105 and sheath 106. Next, a protective material 107 forms an outer jacket or casing around sheath 106, resulting in the composite fiber optic cable 100. The protective material 107 may be made of an electrically insulating material such as polyethylene.

Figure 2:
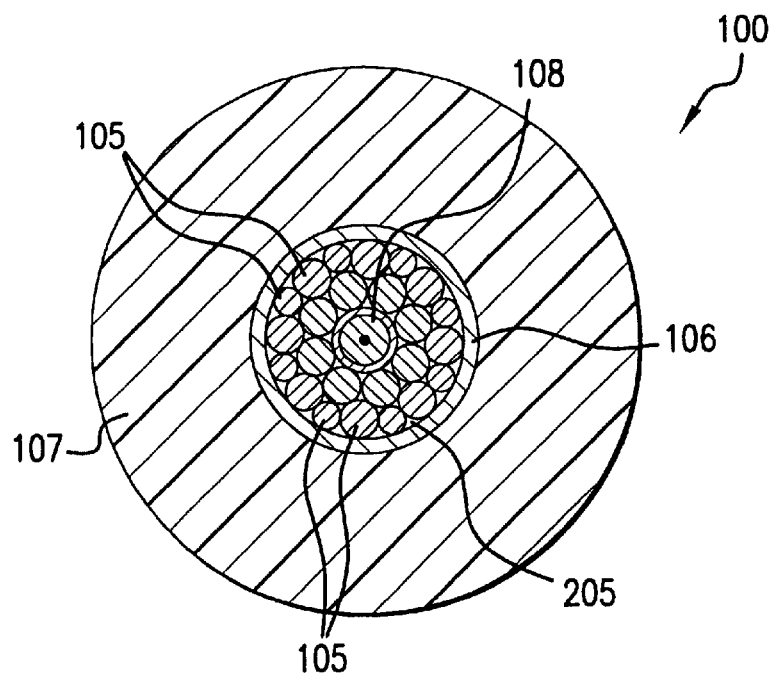
FIG. 2 shows a cross section of the fiber optic cable of FIG. 1 taken along line 2—2.

Referring now to FIG. 2, a cross section of the fiber optic cable 100 of FIG. 1 taken along line 2—2 is shown. As illustrated, the fiber optic cable 100 has a central portion, the UFS 108, surrounded by a plurality of strength wires 105. The strength wires 105 are surrounded by the containment cylinder or sheath 106. Material 205 partially or totally fills the various voids which occur throughout the strengthening wire array, or arrays, formed between the UFS 108 and the containment cylinder or sheath 106. This fill material may be, for example, a gel, a grease, an elastomer, a plastic, etc., and may act as a water blocking material to prevent the invasion and/or migration of water, moisture, or other contaminants which may enter into the fiber optic cable 100, for example, if the cable were to be ruptured, or if an open cable end were exposed to an unfavorable surrounding environment.

Figure 3:
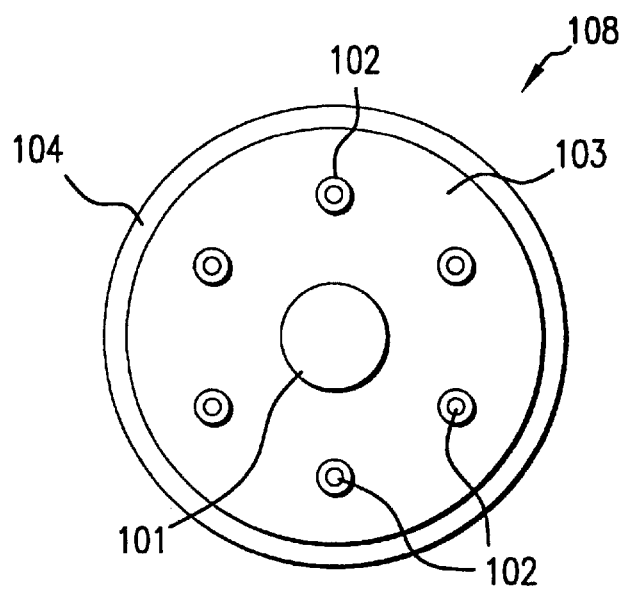
FIG. 3 shows and enlarged sectional view of the fiber optic cable core 108 of FIGS. 1 and 2.

Referring to FIG. 3, an enlarged sectional view of the fiber optic cable core or UFS 108 of FIGS. 1 and 2 is illustrated. The longitudinally extended wire 101 is surrounded by the embedding material 103 and optical fibers 102. The longitudinally extended wire 101 may be referred to as a king wire. The optical fibers 102 may be made of, for example, doped silica fiber, which may be overclad with one or more protective layers of materials such as acrylates, nylons, etc. The silica, or glass, portion of optical fibers 102 may be constructed to have two (or more) cylindrical strata with different refractive indices: (1) a higher refractive index core in which the major portion of the optical signal power is carried, (2) a refractive index cladding, which serves (a) to carry a small portion of the optical power, and (b) to mechanically support the core area of the fiber where most of the optical signal power is concentrated. The embedding material 103 may be an elastomer, which not only serves to act as a buffer between the structural elements of the cable and the fibers, but also tightly couples the location of all portions of the fibers to that of the cable structure. The embedding material 103 may be surrounded by optional outer jacket 104. The optional outer jacket 104 may be made of, for example, nylon, polymeric material, metallized material, or metal.

Figure 4:
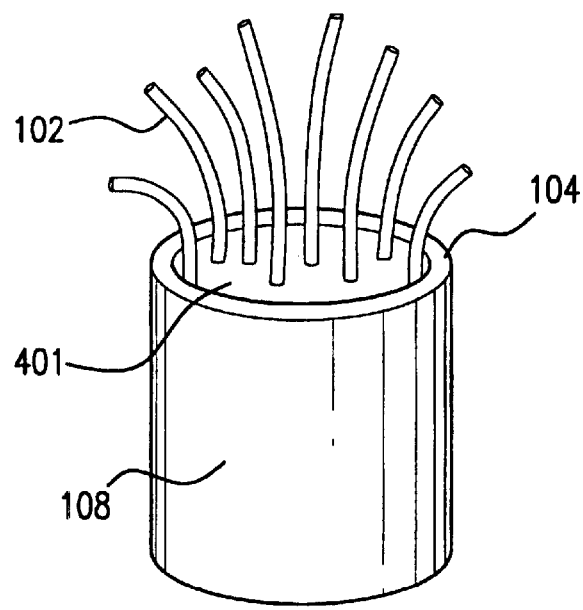
FIG. 4 shows and enlarged sectional view of an alternative fiber optic cable core 108 for the fiber optic cable illustrated in of FIGS. 1–2.

An enlarged sectional view of an alternative fiber optic cable core or UFS 108 for the fiber optic cable illustrated in of FIGS. 1–2 is illustrated in FIG. 4. In this embodiment there is no longitudinally extended wire 101 in the center of the UFS 108. Rather, the optical fibers 102 are floating within embedding material 401. Embedding material 401 is made of a substance, for example a gel or grease, which allows the optical fibers to move within the UFS 108 without the rigidity of the elongated wire 101 or the station confinement provided by the elastomer 103.

Figure 5:
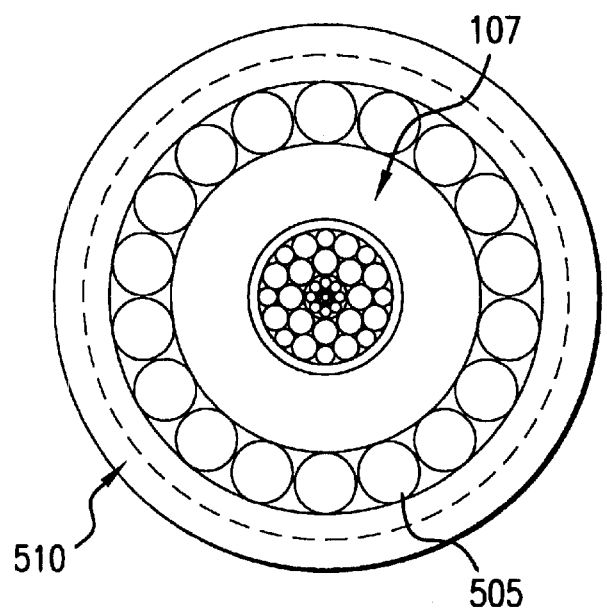
FIG. 5 shows a cross section of the fiber optic cable of FIG. 1 taken along line 2—2 with addition layers for creating an armored fiber optic cable.

Any fiber optic cable 100 may be formed as an armored or unarmored cable to protect the outer casing, or insulating, member 107 of the fiber optic cable 101 from being broken or penetrated by foreign objects such as fishing equipment, small boat anchors, sharp rocks, or animal bites. Referring to FIG. 5, a cross section of the fiber optic cable of FIG. 1 taken along line 2—2 is illustrated including addition layers for creating an armored fiber optic cable. The protective, or electrically insulating, material 107 which forms an outer jacket or casing of the unarmored optical fiber cable 100 is surrounded by armor materials such as armored strands of wire 505, or one or more wraps of metallic tape. The armor material 505 is then encased within another jacket or casing material such as polyethylene, polymer, PVC, or tar-impregnated jute. As constructed the fiber optic cable is highly resistant to undesirable penetration.

Figure 6:
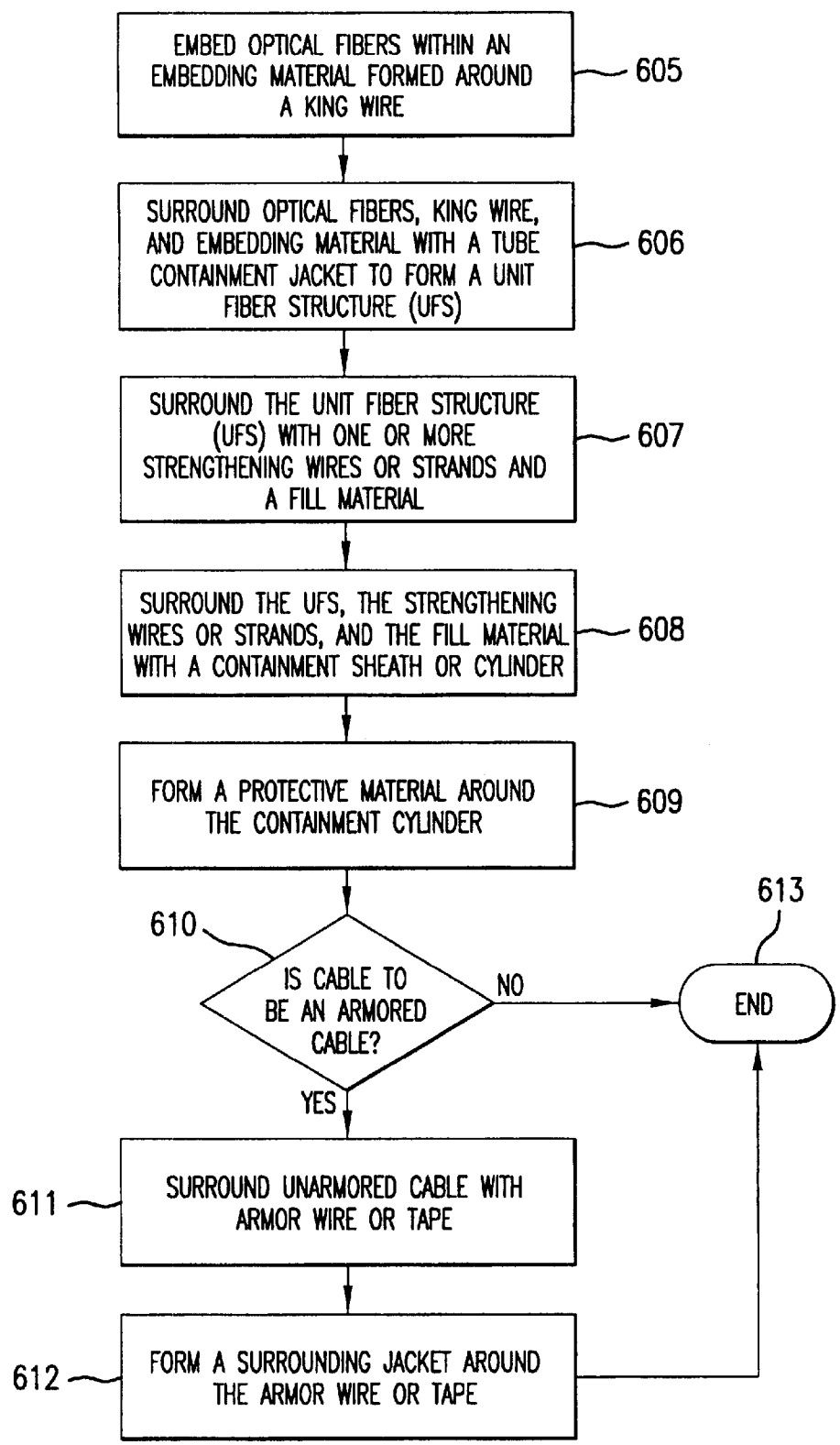
FIG. 6 is a process flow diagram illustrating one preferred method of assembling a fiber optic cable according to the structure of FIGS. 1–3 and 5 in which the present invention may be included.

Exemplary processes for making these various embodiments of fiber optic cables in which the present invention may be used will now be explained. Referring to FIG. 6, a process flow diagram illustrating one preferred method of assembling a fiber optic cable 101 according to the structure of FIGS. 1–3 and 5 in which the present invention may be included. First, at step 605, optical fibers 102 are surrounded by an embedding material 103 formed around a longitudinally extended wire 101 (typically referred to as a king wire). Next, at step 606, the optical fibers 102, king wire 101, and embedding material 103, may be surrounded by an optional containment jacket or tube 104, which in total forms a unit fiber structure 108. Then, in step 607, the unit fiber structure 108 is surrounded with one or more strengthening strands or wires 105 and a fill material 205. Next, in step 608, the UFS 108, strengthening strands or wires 105, and fill material 205 may be surrounded by a containment sheath or cylinder 106. This containment sheath or cylinder 106 may be made of, for example, copper, and may be welded to form a hermetic or semi-hermetic seal. The strength wires 105 and metal sheath 106 may form an electrical conductor. In step 609 a protective, or electrically insulating, material 107 may be formed around the containment cylinder. At decision step 610 it is determined whether the fiber optic cable 101 is to be armored. If not, the process ends at step 613. However, if the fiber optic cable 101 is to be armored, the process continues at step 611. At step 611, the unarmored fiber optic cable 100 formed at step 609, is surrounded with an armor material such as armored strands of wire 505 or penetration resistant tape. The armored material may be made of any high strength materials that are capable of carrying the tensions associated with preplanned installation and recovery scenarios, such as trench burial and extraction from the burial trench to facilitate repairs; likewise the armored material must be penetration resistant. Then, at step 612, a surrounding jacket 510, which may be a composite material, is formed around the armored wire array or tape. As such, a process for forming a number of exemplary fiber optic cable 100 embodiments, which include a central longitudinal wire is provided.

Figure 7:
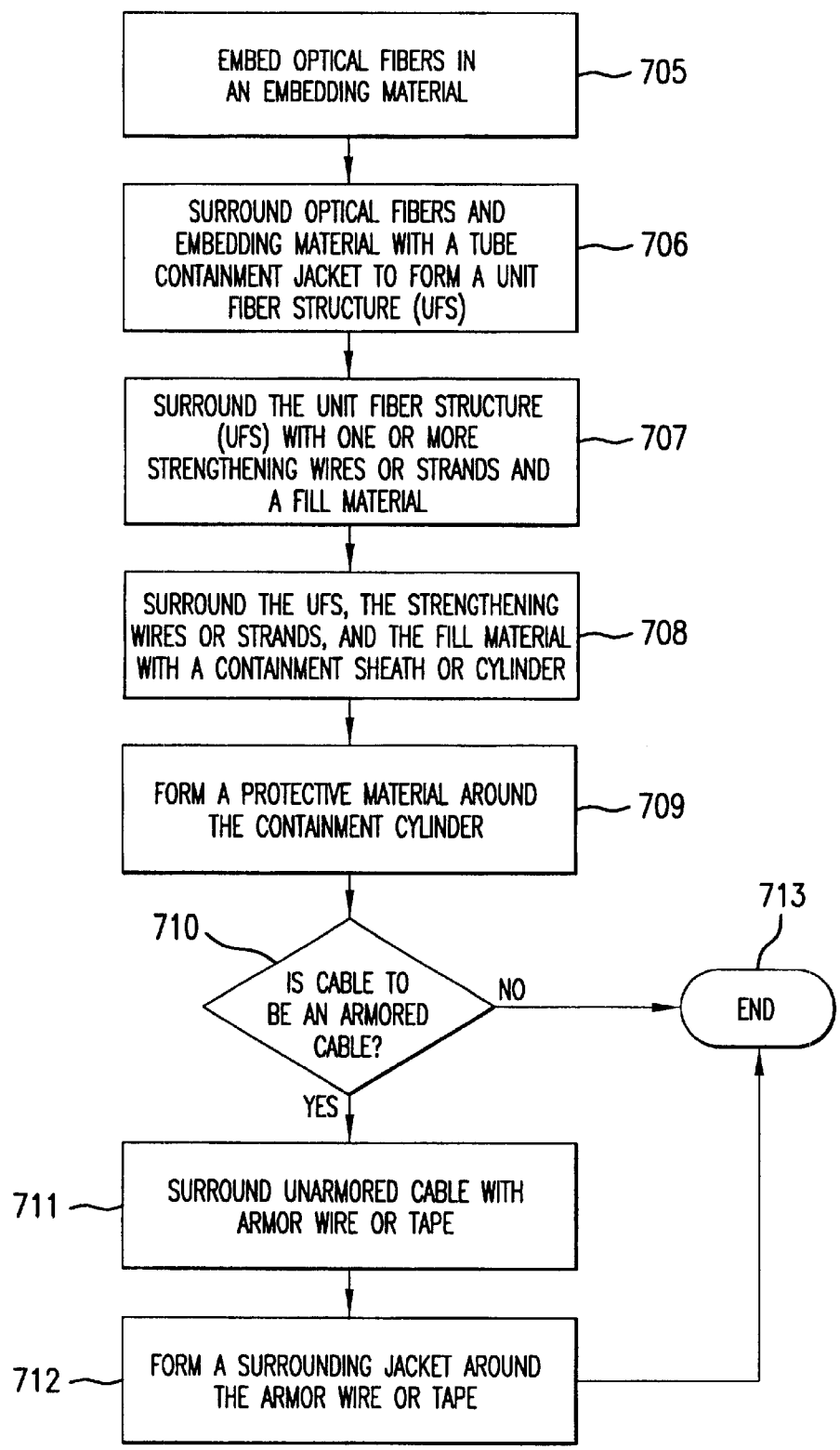
FIG. 7 is a process flow diagram illustrating another preferred method of assembling a fiber optic cable according to the structure of FIGS. 1–2 and 5 in which the present invention may be included modified to include the alternative fiber optic cable core 108 illustrated in FIG. 4.

FIG. 7 is a process flow diagram illustrating another preferred method for assembling a fiber optic cable 100 according to the structure of FIGS. 1, 2, and 5 in which the present invention may be included modified to include the alternative fiber optic cable core 108 illustrated in FIG. 4. First, at step 705, optical fibers 102 are embedded in an embedding material 401. This embedding material 401 may be made of a high viscosity material, gel, or grease so as to allow the optical fibers 102 to float relatively freely within the UFS 108. Next, at step 706, the optical fibers 102 and embedding material 401 may be surrounded by a containment jacket or tube 104 and form a unit fiber structure 108. Then, in step 707, the unit fiber structure 108 is surrounded with one or more strength strands or wires 105 and a fill material 205. Next, in step 708, the UFS 108, strength strands or wires 105, and fill material 205 may be surrounded by a containment sheath or cylinder 106. This containment sheath or cylinder 106 may be made of, for example, copper, and may be welded to form a hermetic or semi-hermetic seal. The strengthening wires 105 and metal sheath 106 may form an electrical conductor. In step 709 a protective material 107 may be formed around the containment cylinder. The protective material may be, for example, a dielectric or insulation material, etc. At decision step 710 it is determined whether the fiber optic cable 100 is to be armored. If not, the process ends at step 713. However, if the fiber optic cable 100 is to be armored, the process continues at step 711. At step 711, the unarmored fiber optic cable 100 formed at step 709, is surrounded with an armor material such as armored strands of wire 505 or tape. The armored material may be a high strength material capable of carrying installation-dependent longitudinal tensile loads and must also be penetration resistant. Then, at step 712, a surrounding jacket 510, which may be a composite material, is formed around the armored wire or tape. As such, a process for forming a number of exemplary fiber optic cable 101 embodiments without the use of a center longitudinally extended wire, alternately referred to as a king wire, is provided.

These various fiber optic cables 100 are susceptible to post cabling degradation such as increased signal attenuation loss due to diffusion and reaction of low levels of hydrogen that exist within the fiber optic cable casing by various mechanisms. The susceptibility depends on the design and manufacture of the fiber optic cable 101 and the environment in which the fiber optic cable 101 is used. Hydrogen may be present within the cable structure as a result of processes associated with optical fiber manufacture prior to the introduction of these fibers into a fiber optic cable. For example, the fiber coatings that surround the silica member may be unstable and evolve hydrogen or the coatings may contain excessive moisture, leading to the subsequent breakdown of hydrocarbon materials or metallic corrosion. Likewise, processes associated with fiber optic cable manufacture itself may set the stage for later hydrogen generation. For example, moisture from a high humidity manufacturing environment may be incorporated within the final fiber optic cable structure; when that cable is subject to a low temperature environment (for example, 3° C. at deep ocean depths), entrapped moisture previously in the vapor phase may condense and participate in corrosion reactions with the metallic members of the cable, and thereby liberate hydrogen. Another mechanism by which hydrogen can be present in the cables is by the breakdown of organic materials comprising the cable. Still another method by which hydrogen can be present in the cable is by generation outside the confines of member 106, and its subsequent migration into the interior of the cable because of the use of, for example, a non-hermetic sheath 106. In any case, once present in the fiber optic cable, hydrogen can readily diffuse into the core regions of the optical fibers. The presence of hydrogen can degrade fiber transmission by either, or both, of the following two mechanisms: (1) By remaining as unreacted molecules, which suffer resonant excitation when excited by transmitted optical signals, they abstract energy from the propagating electromagnetic waves comprising the signal. (2) The hydrogen chemically reacts with active defect sites associated with silica and dopant materials within the optical fibers, forming one or more compounds (for example, hydroxyls of silica and germanium) that have resonant absorption peaks in the vicinity of the commonly used fiber transmission bands. Of the two degradation mechanisms, that associated with chemical reaction poses the greater threat. The current invention significantly reduces the magnitude of the threat posed by chemical reaction mechanism, i.e., the second of the threat mechanisms listed above.

The hydrogen, which is present in the fiber optic cable for any of the reasons described above, may, over a relatively short period of time, diffuse into the optical fibers housed within the fiber optic cable eventually migrating to the core regions of the optical fibers. For example, with silica optical fibers having diameters of 125 μm, 95% of diffusion equilibrium is reached in about 13 days at 21° C. The major impact of the migration of this early molecular hydrogen into the core regions of the fibers will be to increase the attenuation due to hydrogen molecular resonance activity. Typically this resonance activity is manifested by a series of resonant attenuation peaks at different wavelengths. Resonance tails extend into the 1330 and 1550 nm transmission bands and increase the attenuation in those bands. For a well made cable, with an internal hydrogen content of about 0.001 atmosphere (atm), the attenuation increase is quite small, typically well under 0.001 dB/km at a transmission wavelength of 1550 nm. Moreover, if there is no further increase in hydrogen within the cable as a function of time, the incremental component of attenuation increase due to unreacted molecular hydrogen will remain stable, which is very desirable for wideband transmission systems employing, for example, dense wavelength division multiplexing (DWDM) technology.

The presence of dissolved hydrogen in silica can lead to another, more serious, phenomenon than that which is manifested by molecular resonance activity. This phenomenon involves the chemical combination of hydrogen with silica and dopants such as germania at chemically active defect sites within the as-manufactured fiber. This chemical activity leads to the creation of impurity species such as hydroxyls and hydrides, which also manifest resonant peaks with tails extending in the transmission band. It is estimated that for our previously mentioned 0.001 atm hydrogen partial pressure, the long term attenuation increase due to chemical reaction will be, for example, on the order of 0.01 dB/km at 1550 nm if the cable is maintained at 3° C., the approximate deep sea temperature. Note that this component of attenuation increase is more than an order of magnitude larger than that due to unreacted molecular hydrogen resonance activity.

Figure 8:
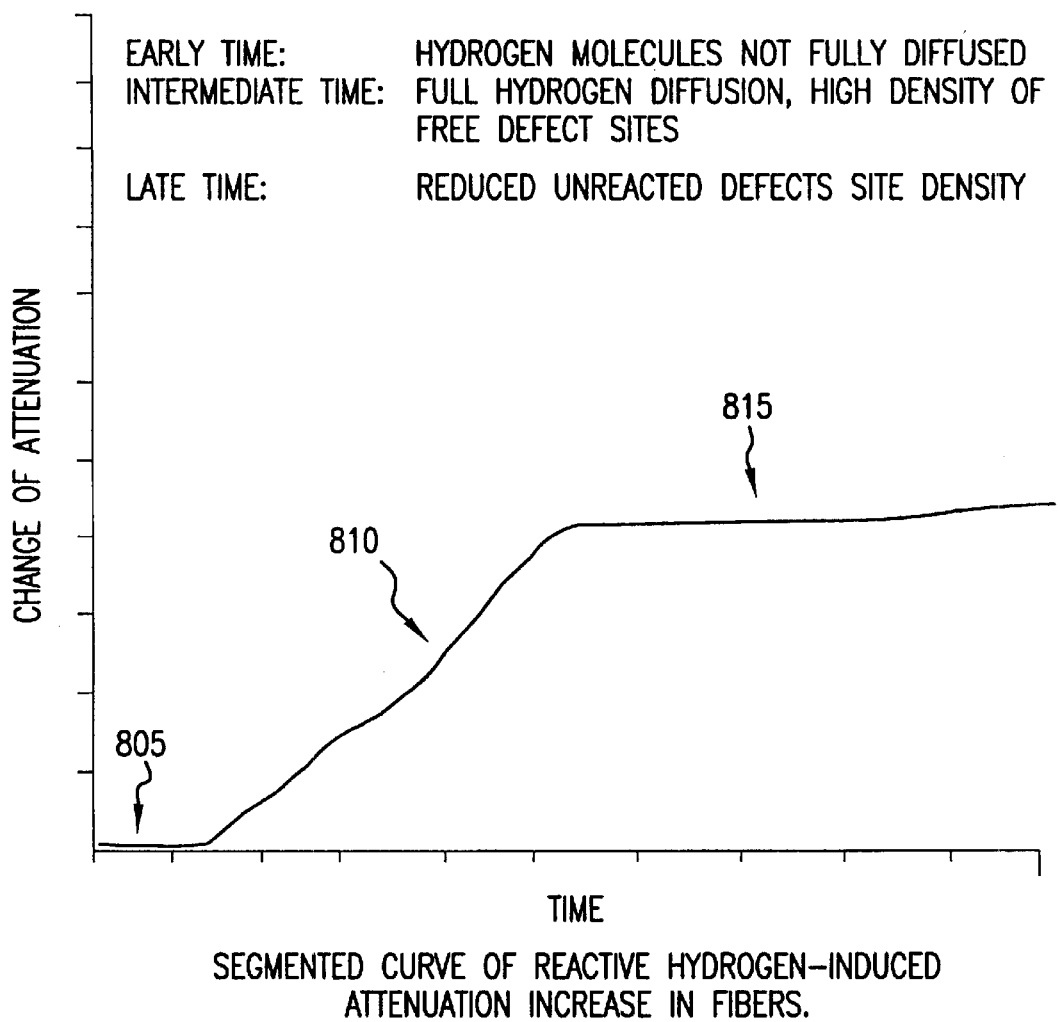
FIG. 8 is a simplified graph illustrating the change in attenuation versus time caused by the chemical reaction of hydrogen at glass defect sites within the core regions of optical fibers in typical cable embodiments which do not include the invention.

The general growth characteristic of the chemically-induced attenuation change is illustrated in the simplified and idealized representation of FIG. 8. In the very early period, 805, hydrogen is still in the process of diffusing into the fiber core. Thus in this period, there is an abundance of defect sites and a scarcity of hydrogen. Once hydrogen has reached the equilibrium diffusion level, there is an abundance of hydrogen and an abundance of defect sites; hence the more rapid change of attenuation, 810 in FIG. 8. At longer time periods (815 in FIG. 8), the reaction rate is limited due to having previously occupied many of the defect sites that are capable of readily reacting at the temperature and partial pressure conditions. Finally, it is noted that the reaction time in which most of the chemical reactions take place is on the order of weeks at 21° C. room temperature and months at 3° C. sea bottom temperatures.

The present invention is directed to addressing the concerns caused by the hydrogen-induced chemical activity in optical fibers which may lead to small, but significant, attenuation changes, and that these attenuation changes can occur over a long period of time, thereby upsetting the spectral response of fiber optic communication systems such as those that include erbium-doped fiber amplifiers and optical filters. According to the present invention deuterium (herein referred to as $D_2$) is introduced to react with and occupy the defect sites in the optical fibers with deuterium-based reaction products before any significant amount of hydrogen can react with and occupy the defect sites so as to suppress or eliminate the principal detrimental effect caused by the presence of hydrogen in the fiber optic cables, namely, reactive hydrogen-induced attenuation increases.

Findings suggest that, when $SiO_2$ based optical fiber defect sites are occupied by deuterium-based reaction products, the materials will have different resonant overtone wavelength peaks and tails compared to those of hydrogen-based reaction products. Since deuterium combined with the optical fiber materials has resonances and resonance tails located in areas of the optical spectrum far from where the optical systems are generally operated, the signal attenuation of the optical communication signals is not appreciably changed even though the optical fiber material contains impurities due to deuterium reaction products at various defect locations throughout. Once the optical fibers are treated with deuterium and the deuterium reacts by bonding with the optical fiber material at defect sites, these defect sites are at their lowest possible energy level and will not likely be replaced by hydrogen reaction products due to reaction with hydrogen that has subsequently diffused into the optical fibers. Alternatively, if the ratio of deuterium to hydrogen contained within the fiber optic cable is high, then the probability of more defect sites being occupied by deuterium rather than hydrogen is increased and there will be improved lifetime fiber attenuation stability. In either case, the deuterium, rather than hydrogen, will occupy a number of defect sites in the optical fiber, and the stability of the long term attenuation performance of the cabled fibers will be improved because the resonance overtones associated with deuterium reaction products are located in benign spectral zones so as to not give rise to the amount of age-related degradation that would otherwise be experienced without the use of deuterium. This approach is equally applicable to the introduction of other yet unknown substance(s) that is(are) spectrally benign at the optical wavelengths of interest, so as to substitute for hydrogen at the various defect sites in the optical fibers.

There are a number of general approaches for introducing deuterium in order to suppress the chemical reactions that might otherwise occur in the presence of ordinary hydrogen. A first general approach is to institute deuterium reaction prior to ordinary hydrogen ingress into the optical fiber cores. In this case, post-deuterium introduction process conditions (temperature and time) are such that a significant level of deuterium reaction can occur at the defect sites. Even though some deuterium may escaped from the optical fibers via diffusion in a time interval between deuterium introduction and the time at which many of the chemical reactions take place, steps are taken so that a sufficient amount of dissolved unreacted deuterium remains in the core regions of the fibers at the point in time (e.g., at an elevated temperature step in the assembly process) at which most of the defect site reactions take place so as to ensure that most of the reactive defect sites that would have reacted with ordinary hydrogen instead react with deuterium. Thus, most of the deuterium reactions take place before significant levels of ordinary hydrogen diffuse into the core regions of the fibers.

An example of the first approach to utilizing deuterium to neutralize hydrogen induced attenuation, which will be further elaborated below, is that of pre-soaking optical fibers in deuterium and then using the time and temperature conditions of subsequent cable processing to react the deuterium with the defect sites. Once the desired level of deuterium reaction takes place, much of the remaining unreacted dissolved deuterium can exit the optical fibers via diffusion. Later cable processing steps, in which ordinary hydrogen evolves and diffuses into the core regions of the fibers, will not adversely affect the stability of the attenuation characteristics of the optical fibers, because those defect sites at which chemical attack normally occur will have been neutralized by their having entered into prior chemical combination with deuterium. Stated differently, the population of unreacted defect sites, which are candidates for reaction with ordinary hydrogen, will have been reduced due to their having been combined with deuterium prior to the entrance of ordinary hydrogen to the defect site locations within the core of the optical fibers.

A second general approach is to institute a procedure in which a high population ratio of deuterium to ordinary hydrogen molecules exists in anticipation of the arrival of both species at the optical fiber core regions within approximately the same time frame. The time of arrival of significant numbers of deuterium at the optical fiber core regions should either precede, or be sufficiently coincident with, the time of arrival of significant numbers of ordinary hydrogen molecules so that the molecular density ratio of dissolved deuterium to dissolved hydrogen at the core regions of the fibers is relatively high prior to hydrogen reacting with the defect sites. This will help to ensure that the preponderance of active fiber defect sites combine with deuterium instead of ordinary hydrogen. For example, if deuterium is introduced into a material other than the optical fibers themselves and requires suitable time and temperature conditions to diffuse into the optical fiber core regions, then the cable structure surrounding the material containing the deuterium should slow, reduce, or resist the rate of deuterium egress so that a greater amount of deuterium proceeds to ingress to the optical fiber core. Otherwise, excessive deuterium may escape prior to having diffused in sufficient quantity into the core regions of the fibers.

An example of this approach to treating the optical fibers with deuterium, which will be further elaborated below, is associated with introduction of deuterium in the cable fill materials such as water blocking material. Typically cable processing steps which follow the introduction of the fill material can result in the evolution of low levels of ordinary hydrogen. Both the deuterium and ordinary hydrogen may diffuse into the optical fiber core regions, and both isotopes may react at defect sites. However, given that the fill material contains a high ratio of deuterium to ordinary hydrogen, most reactions with defect sites will involve deuterium, which is relatively benign at the operating wavelengths of interest. Thus, this approach will thereby limit those harmful reactions that might otherwise occur with only ordinary hydrogen present at the optical fiber core regions. Here, the cabling material, or materials, surrounding the deuterium-loaded fill material may be relatively impermeable to the egress of deuterium prior to, or during, the process which evolves ordinary hydrogen. Stated differently, only a limited amount of deuterium introduced into the fill material should escape from the fiber optic cable structure before diffusing in sufficient quantities into the optical fiber core regions and reacting at the defect sites in those regions.

Figure 9:
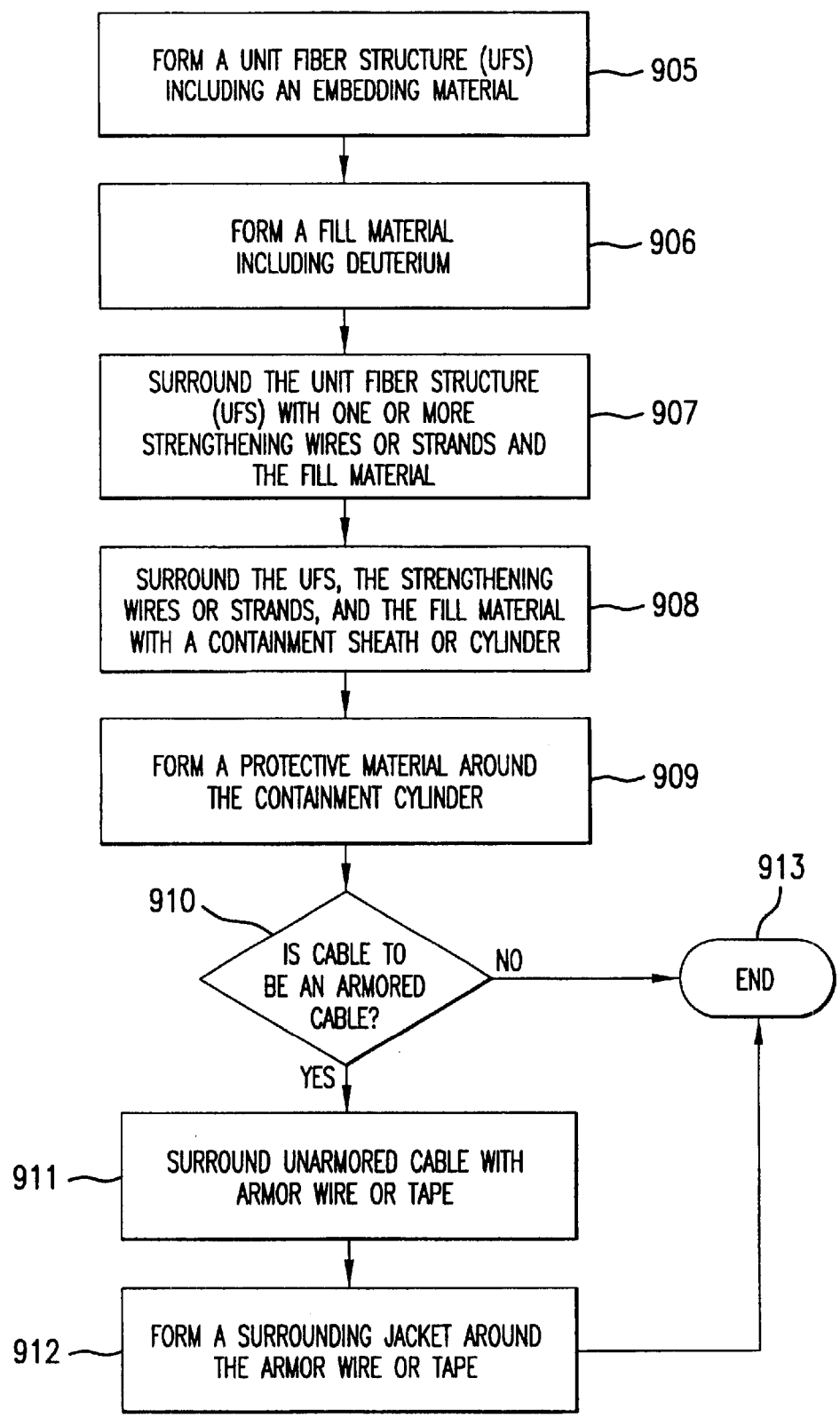
FIG. 9 is a process flow diagram illustrating one preferred method of making a fiber optic cable according to the present invention.

According to one exemplary embodiment of the invention deuterium is introduced into a fill material used in the fiber optic cable. FIG. 9 shows a process flow diagram illustrating a first preferred method of making a fiber optic cable according to the present invention. First, at step 905, a unit fiber structure 108 is formed including optical fibers 102 embedded in an embedding material 103 or 401. Next, at step 906, a fill material 205 including deuterium is formed. According to one variation of the invention, the fill material 205 may be a water blocking material used to ensure water or moisture does not penetrate various areas where voids would be found if the fill material 205 was not used. Then, at step 907, the unit fiber structure 108 is surrounded with one or more strengthening strands or wires 105 and the fill material 205. Next, in step 908, the UFS 108, strength strands or wires 105, and fill material 205 may be surrounded by a containment sheath or cylinder 106. This containment sheath or cylinder 106 may be made of, for example, copper, and may be welded to form a hermetic or semi-hermetic seal. The strengthening wires 105 and metal sheath 106 may form an electrical conductor.

Then, in step 909, a protective material 107 may be formed around the containment cylinder. The protective material may be, for example, a dielectric or insulation material, etc. At decision step 910 it is determined whether the fiber optic cable 100 is to be armored. If not, the process ends at step 913. However, if the fiber optic cable 100 is to be armored, the process continues at step 911. At step 911, the unarmored fiber optic cable 100 formed at step 909, is surrounded with an armor material such as armored strands of wire 505 or tape. The armored material may consist of one or more arrays of high strength steel wires or alternate non-metallic material(s), so long as the material(s) has(have) the required tensile strength and resistance to penetration properties required in the particular application. Then, at step 912, a surrounding jacket 510, which may be a composite material such as tar-impregnated jute or a polymeric jacket, is formed around the armored wire or tape. As such, a process for forming a number of exemplary fiber optic cable 100 embodiments including a longitudinally extending center wire is provided. In another exemplary embodiment of the invention, deuterium is introduced into a fiber optic apparatus housing, which contains fiber optic components, prior to sealing the housing.

Figure 10:
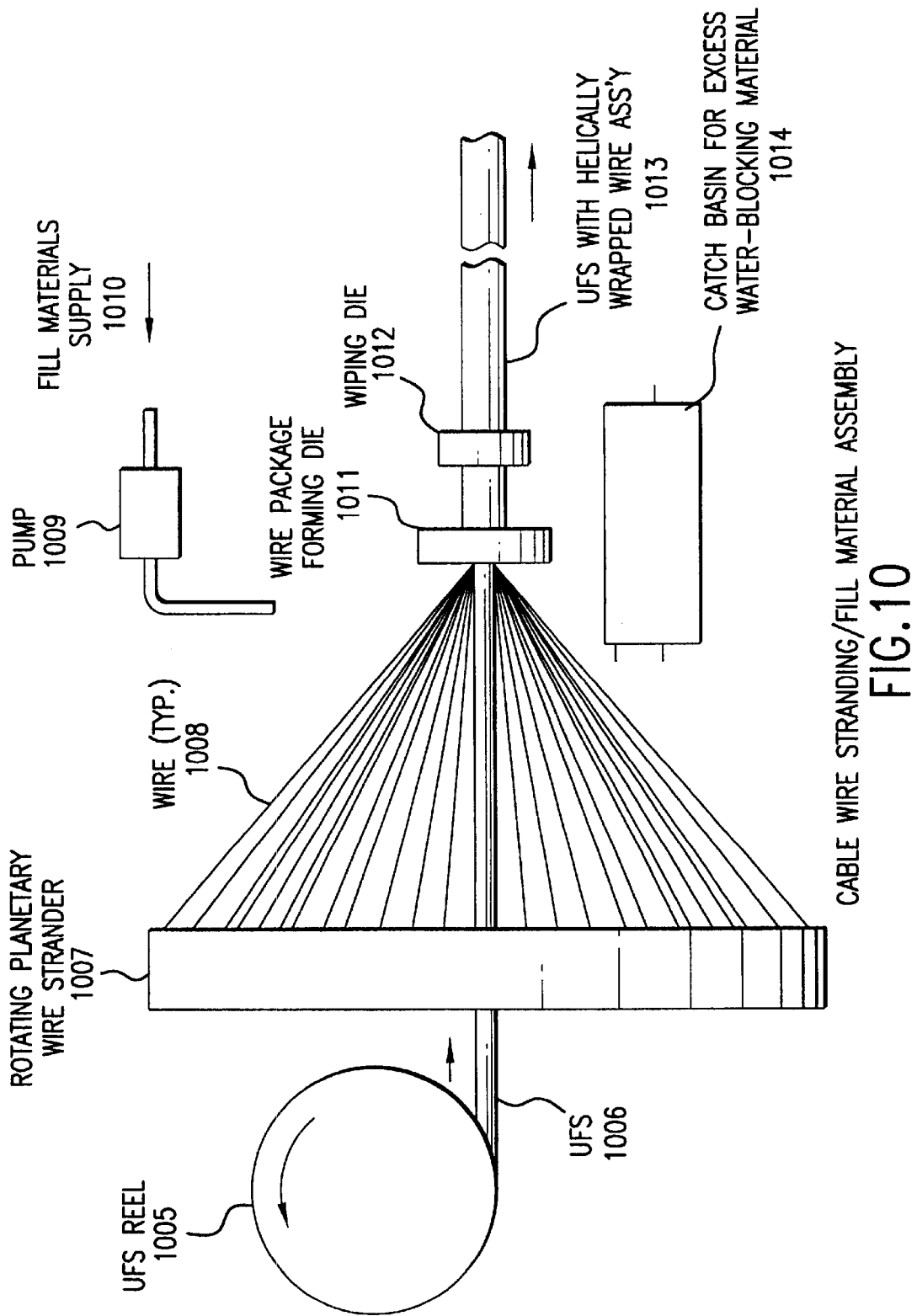
FIGS. 10 and 11 shows a schematic representation of one manner of making a fiber optic cable with the present invention.
Figure 11:
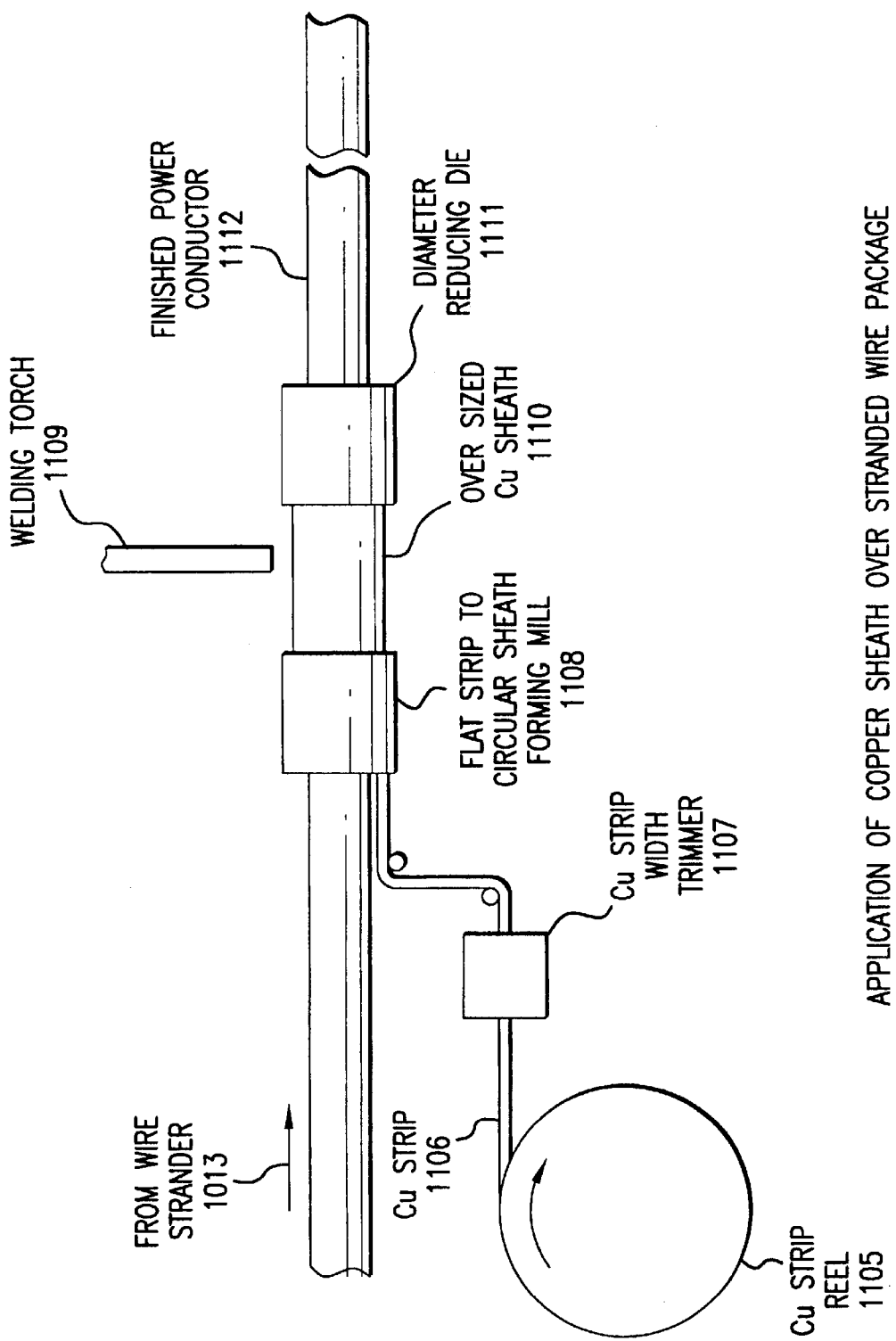

Referring now to FIGS. 10 and 11, schematic representations illustrate one exemplary system and manner of making a fiber optic cable according to the present invention. Starting with FIG. 10, a UFS 1006 is fed out of a UFS reel 1005 through a centrally located aperture of planetary stranding machine 1007 and then into the central position of a wire package forming die 1011. A rotating planetary wire stranding machine 1007 applies a plurality of wires or strands 1008 over the fed out UFS 1006 such that the wire strands are in contact with the UFS and with one another and assume helical paths at a pre-determined pitch. A pump 1009 draws fill material 1010 from a reservoir (see 1211 in FIG. 12) and applies it to the UFS 1006 and wires or strands 1008 just prior to entering the wire package forming die 1011. A catch basin 1014 catches the excess fill material. The UFS 1006 and the surrounding wires or strands 1008 and fill material 1010 are fed through a wiping die to produce a smooth formed cylindrical subassembly 1013 including the UFS 1006 and helically wrapped wires 1008.

Then, as illustrated in FIG. 11, this subassembly 1013 is fed along with a containment material such as flat copper strip 1106 into a flat-strip-to-circular-cross-section sheath forming mill 1108. The copper strip 1106 may be fed from a copper strip reel 1105 and through a copper strip width trimmer 1107 into the flat-strip-to-circular-cross-section-sheath-forming-mill 1108 in a manner so as to flow parallel to, and at the same speed of, the adjacent subassembly 1013. Next, the containment cylinder or circular-cross-section sheath, for example, an oversized copper sheath 1110, may be welded at the butting zone where the opposite edges of the strip meet as a result of action of the flat-copper-strip-to-circular-cross-section shaping action. This weld is made by welding torch 1109. The containment cylinder may form a hermetic or almost hermetic seal around the assembly 1013. Then, the assembly 1013 and the coaxially deployed over-sized containment sheath 1110 may be fed through reducing die 1111 to reduce the diameter of the oversized copper sheath 1110 such that the inner surface of the cooper sheath is in intimate contact with the outer diameter of subassembly 1013, resulting in what is here referred to as the finished power conductor 1112. This power conductor, in a subsequent operation, is overclad with an extruded dielectric insulating sheath 107. With the completion of the dielectric sheath 107, the resultant product would be the fiber optic cable 100 without armor. This completed product 100 would be suitable for installation and use in those applications that do not require armoring. For example, this cable type may be uses in submarine applications such as a deep sea optical fiber cable, where the threat of cable damage caused by fishing activity and fish-bite is minimal.

For those applications requiring the additional protection afforded by armoring, the completed unarmored cable assembly 100 is subjected to additional processing steps. An armored fiber optic cable may be completed by, for example, feeding the unarmored cable 100 through an additional wire stranding machine, a wire pack forming die, and a surrounding protective jacket forming process.

According to the present invention, the fill material supply 1010 may include deuterium prior to being applied to the UFS and strength wires or strands by pump 1009. The deuterium may be introduced into the fill material supply 1010 by dissolving the deuterium into the material using the approach shown in FIG. 12, where deuterium-rich gas occupies the space over liquid filler material and, after a short period of time, diffuses into the liquid, creating a liquid with dissolved deuterium. This dissolving of deuterium into the fill material solution may be sped up by optional stirring activity. An alternate method of introducing deuterium into the filler material is by bubbling the material with deuterium, thereby creating a foamed material. In either case, the fill material is loaded with deuterium in a sufficient amount to ensure that a predetermined deuterium partial pressure within the confines of sheath 106 is achieved at equilibrium. A portion of this deuterium will diffuse into the core regions of the optical fibers 102. Once in the core regions of the fibers, the deuterium will participate in chemical reactions with available defect sites located in the core regions of the optical fibers, thereby lowering the probability of subsequent harmful reaction with ordinary hydrogen.

Figure 12:
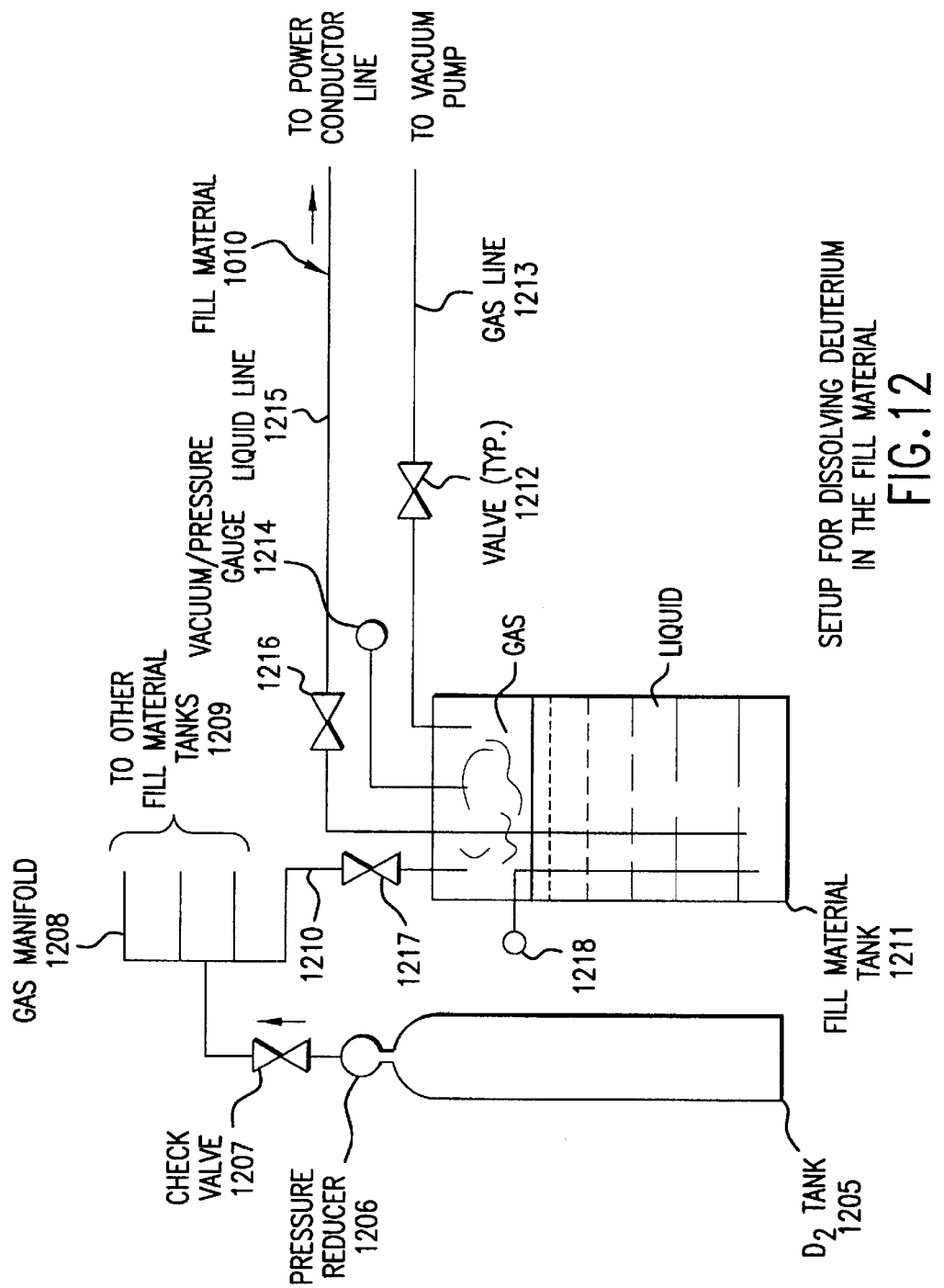
FIG. 12 shows a schematic diagram representing additional processing for making fill material useful in a fiber optic cable according to the present invention.

A first exemplary schematic representing additional processing for making the fill material including deuterium by dissolving deuterium into the fill material is illustrated in FIG. 12. After filling container 1211 with liquid filler material, and with valves in lines 1210 and 1215 set in their shut, or no-flow, positions, the valve in line 1213 is opened, and a vacuum pump is applied to gas line 1213 until such time as a predetermined vacuum level is reached, per the indication on gage 1214. The evacuation of the pre-existing air on the top of tank 1211 is done so as to avoid a situation in which there is a combustible mixture of deuterium and oxygen, and to assure that, following vacuum pumping, the later introduction of deuterium-rich gas is not diluted by air. Deuterium from a $D_2$ tank 1205. or a mixture of deuterium and a neutral gas such as nitrogen, is supplied through a check valve 1207, gas manifold 1208 and gas line 1210 to the top of a fill material tank 1211, where a certain static, or quasi-static pressure is maintained as indicated by gage 1214.

Likewise, in FIG. 12, material tank 1211 includes liquid level gage 1218, aimed at assuring that only liquid filler, with dissolved deuterium, is fed into and through liquid line 1215; in the event liquid filler level becomes too low, gage 1218 will indicate the same in sufficient time so as to switch liquid tank 1211 to an identical type tank attached to a different arm of manifold 1208. The deuterium gas molecules, being very small, readily diffuse into the liquid, creating a solution comprised of the fill liquid and deuterium. Once sufficient time has elapsed for $D_2$ diffusion equilibrium to be reached, valve 1216 in liquid line 1215 is opened and connected to the pump 1009 in order to feed the liquid fill material supply 1010 to the power conductor line shown in FIG. 10. Once the power conductor manufacturing run is complete, or liquid gage 1218 indicates a low liquid level, the deuterium supply valve 1217 in line 1210 will be shut, as will be the liquid line valve 1216 of line 1215, and the deuterium-rich gas will be pumped out by opening the valve in line 1213 and running the vacuum pump (not shown). Then the evacuated space on the top of tank 1211 may be back-filled with $N_2$ at ambient pressure. If the supply of liquid reaches a low level during a manufacturing run, the original tank will be shut down, as described above, and one of the other tanks fed by manifold 1208 will be substituted in its place. Alternatively, the completion of the power conductor run will trigger the shut-down process described above. In both cases, the contents of the spent tank will be replenished for use in future manufacturing runs.

Figure 13:
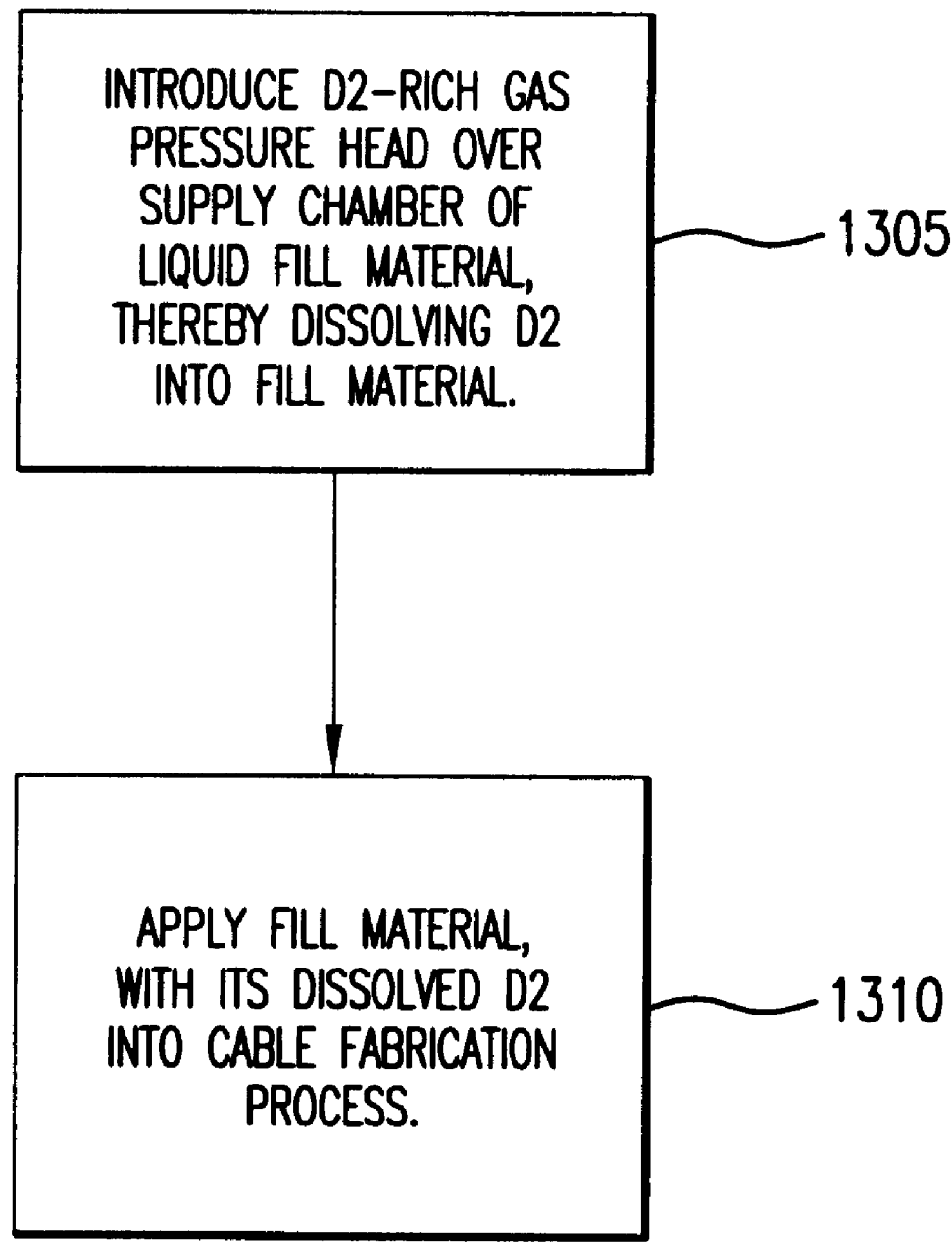
FIG. 13 is a process flow diagram illustrating one preferred method of making a fiber optic cable according to the present invention as shown in FIG. 12.

Referring now to FIG. 13, a process flow diagram illustrating one preferred method of making a fiber optic cable by dissolving deuterium into the fill material, such as a water blocking material is provided. First, at step 1305, a liquid fill material occupies tank 1211 to a height that is well above the lower terminus of liquid line 1215. The top portion of tank 1211 contains a deuterium-rich atmosphere provided by gas supplied from the lower end of line 1210; the upper end of line 1210 is connected to one of the output ports of gas manifold 1208. The maintenance of a deuterium-rich gaseous atmosphere above the liquid level in tank 1211 promotes deuterium diffusion into the fill material, creating a fill material containing dissolved deuterium. Then, at step 1310 the fill material, with its dissolved deuterium, is introduced into the fill material addition step (see also step 906) of the fiber optic cable assembly process via fill material supply 1010 with pump 1009.

Figure 14:
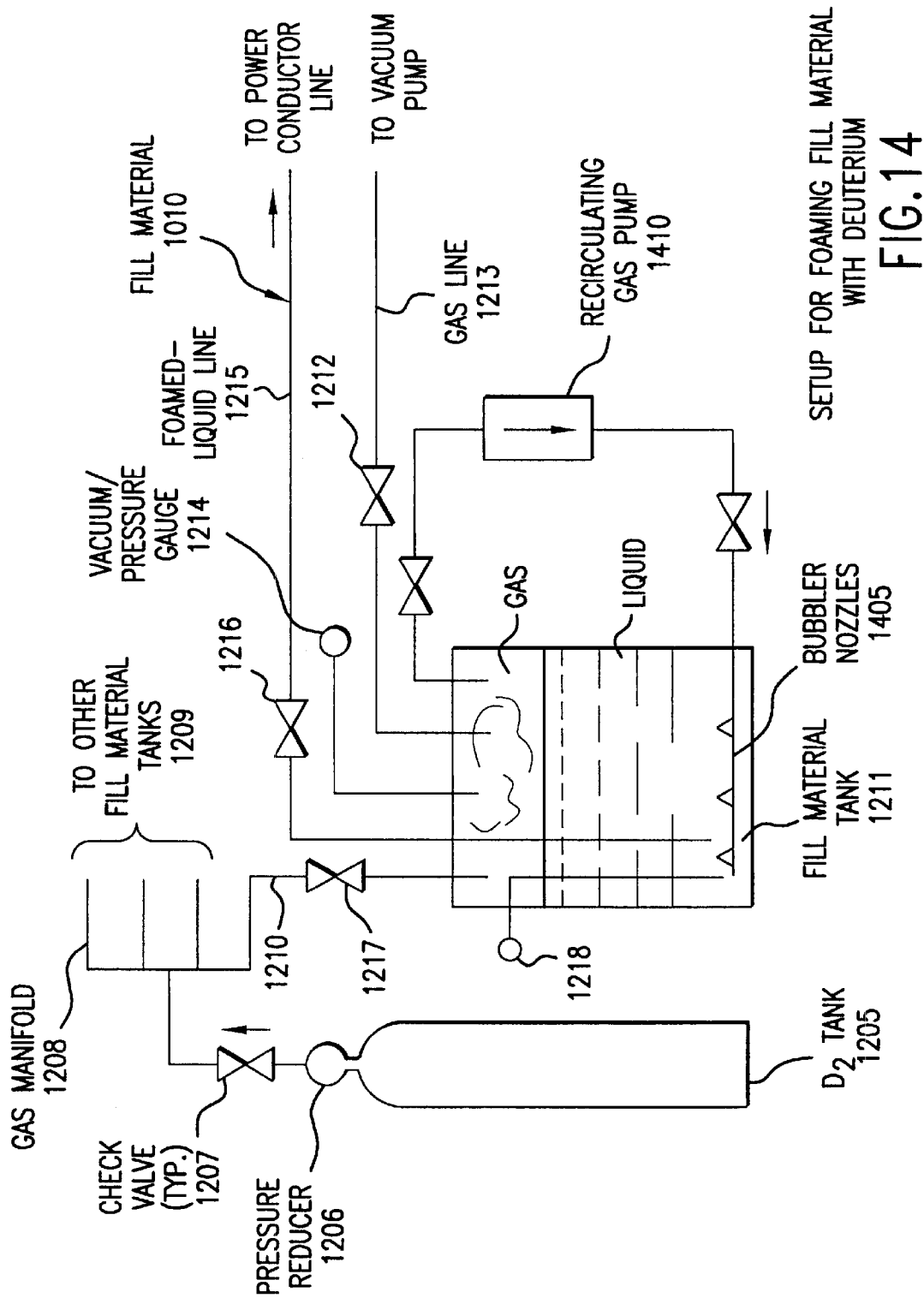
FIG. 14 shows a schematic representing another manner of processing for making fill material useful in a fiber optic cable according to the present invention.

Referring now to FIG. 14, a schematic diagram representing a system and manner for loading the fill material with deuterium by a foaming process is presented. The system is very similar to the system used for dissolving deuterium into the fill material except a bubbling system is added to bubble deuterium through the fill material in the fill material tank 1211. The bubbling system includes a gas recirculating pump 1410 for recirculating the deuterium from the overhead gas zone of tank 1211 into the liquid fill material occupying the lower portion of the fill material tank 1211. The bubbling system also includes bubbler nozzles 1405 to bubble the deuterium into the liquid fill material to create foamed fill material.

Figure 15:
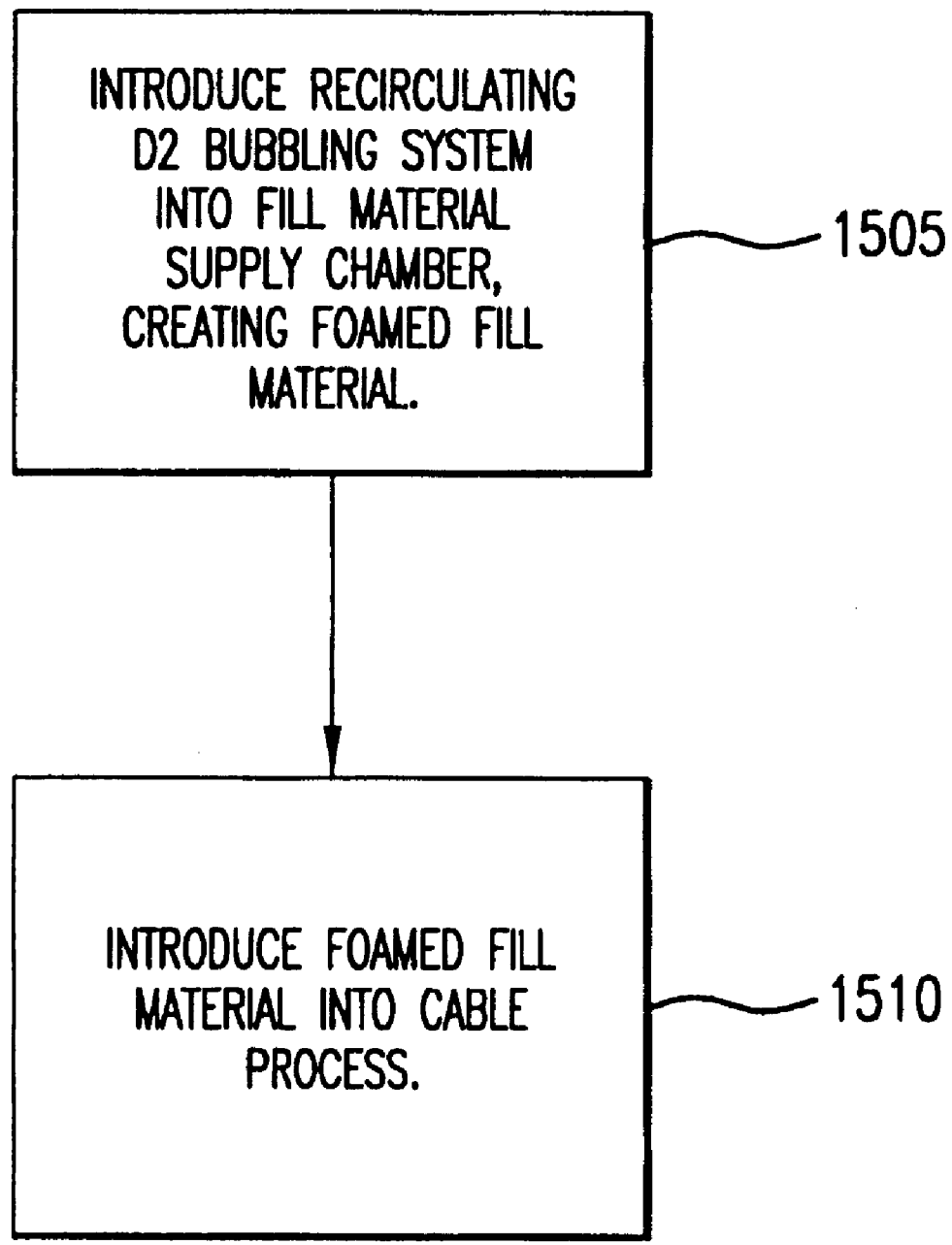
FIG. 15 is a process flow diagram illustrating one preferred method of making a fiber optic cable according to the present invention as shown in FIG. 14.

Referring to FIG. 15, a process flow diagram illustrating a preferred method of making the fill material with deuterium by bubbling the deuterium into the fill material is provided. In this case, at step 1505, the deuterium gas is recirculated and bubbled into the fill material using the bubbling system. Then, at step 1510 the foamed fill material, loaded with deuterium mini-bubbles, is introduced into the fill material addition step (see also step 906) of the fiber optic cable assembly process via fill material supply 1010 with pump 1009.

According to another variation of the invention, UFS reel 1005 may be immersed in a deuterium-rich atmosphere in order to promote the diffusion of the deuterium into the materials comprising UFS 1006. The temperature and time associated with immersion may be such as to ensure that a predetermined quantity of deuterium is dissolved in the polymeric materials included within the UFS, or that a predetermined quantity of deuterium diffuses and dissolves into not only the organic materials comprising the UFS but also into the silica-based fibers as well. This approach, used either alone or in conjunction with the previously described use of deuterium-loaded filler material, will also serve to ensure that there is sufficient deuterium present within the fibers contained inside power conductor 1112 so as to ensure that the many of the defect sites within the fibers are preferably reacted with deuterium instead of hydrogen.

As a variant to the immersion of the entire reel 1105 in a deuterium-rich atmosphere, one can introduce an in-line deuterium-rich chamber between UFS reel 1005 and stranding machine 1007 so as to ensure that some level of deuterium is dissolved into UFS 1006 prior to its being enclosed within finished power conductor 1112. This process may be carried out alone or in conjunction with other deuterium introduction processes described above.

According to another variation of the invention, the material into which deuterium is introduced may be an embedding material, such as embedding material 103 into which the optical fibers 102 are embedded within the casing of the UFS 104. Here we may choose the outer jacket material of the UFS 104 to be relatively impermeable to the egress of $D_2$, so that the deuterium can be diffused into the fibers and reacted with the defect sites of those fibers before possibly escaping to the external atmosphere. Once again, the deuterium may be introduced into the embedding material by any method which results in a sufficient amount of deuterium being retained within the fiber optic cable 100 casing, or UFS subassembly casing 108, so that at least some deuterium diffuses into the cores of optical fibers 102 and reacts with the optical fiber materials to react with at least some of the defect sites. These methods may include, for example, dissolving the deuterium into the embedding material, bubbling the embedding material with deuterium, etc.

According to another exemplary embodiment of the invention, deuterium is introduced into the fiber optic cable 100 by exposing the optical fibers 102 to deuterium prior to assembling the optical fibers 102 into a fiber optic cable 100. In one exemplary embodiment of the invention, matched sets of the optical fiber 102 to be used in a fiber optic cable 100 are immersed in a deuterium-rich atmosphere after the optical fibers 102 have been manufactured but prior to being introduced into the cable manufacturing assembly process. During the immersion period the deuterium diffuses into the optical fibers 102 to create optical fibers with predetermined levels of dissolved deuterium within the doped silica material(s). In one variation of the invention, the optical fibers 102 are placed in a pressure-sealed chamber with deuterium gas at a pre-determined temperature and partial pressure for a prescribed period of time that is sufficiently long so as to ensure that the desired amount of deuterium is diffused and dissolved in the optical fibers 102. In another variation of the invention, the optical fibers are fed through a chamber including deuterium gas as the optical fibers 102 are being fed into the fiber optic cable assembly process to be embedded in an embedding material, for example, during the UFS 108 assembly process. In either case, the optical fibers 102 are exposed to the deuterium under processing conditions so as to diffuse a sufficient amount of deuterium into the optical fibers 102 so that at a later time, for example, during a later processing step, the deuterium enters into chemical reaction at the active fiber defect sites, thereby rendering these sites passive and resistant to subsequent chemical combination with ordinary hydrogen. These processes (for example, the diffusion of deuterium into the fibers, followed by chemical reaction of the deuterium with the active defect sites associated with silica and its dopants at a subsequent process stage, such as the higher temperature fiber embedding process), will serve to improve the long term stability of the attenuation performance of fiber optic cable 100.

Figure 16:
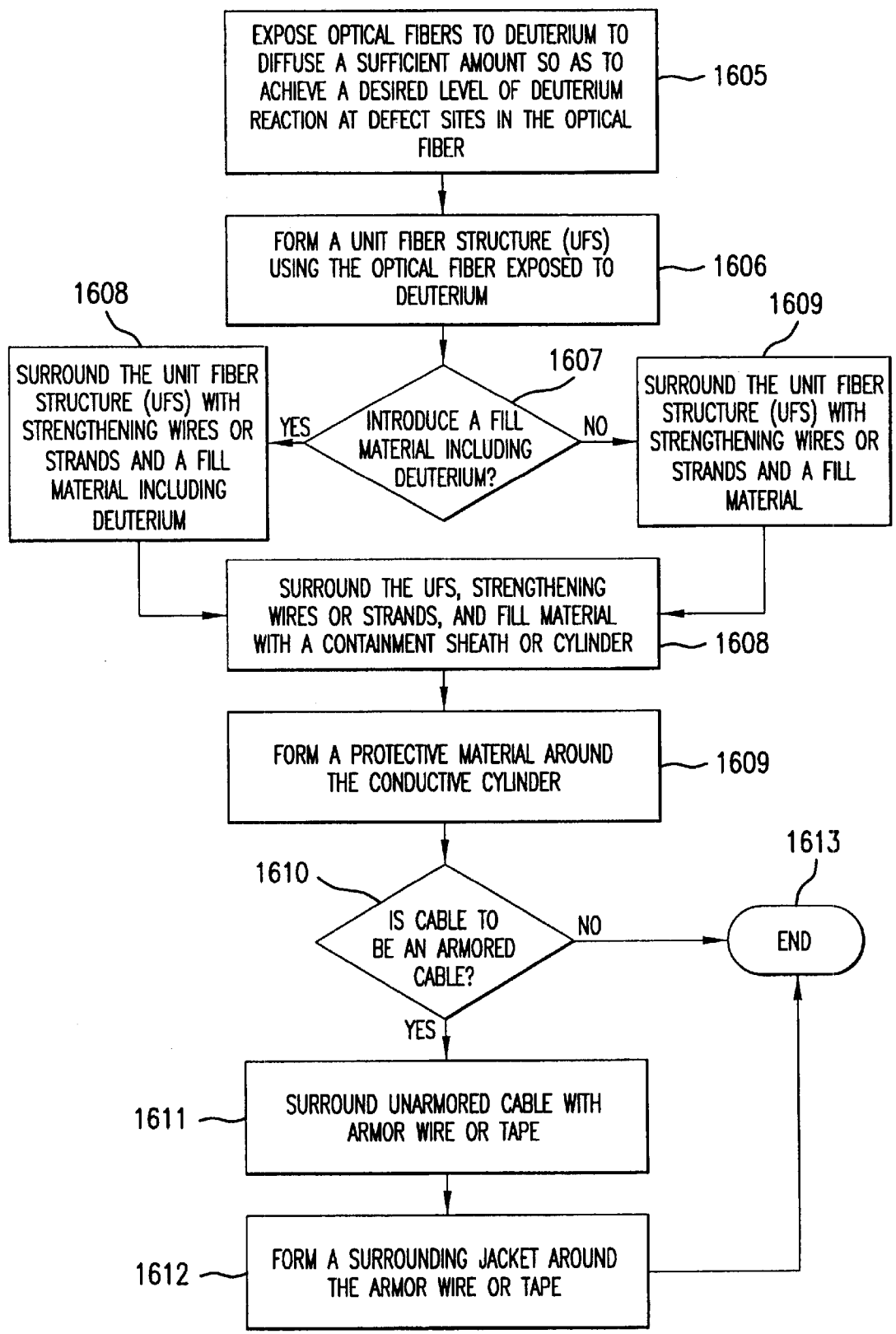
FIG. 16 is a process flow diagram illustrating another preferred method of making a fiber optic cable according to the present invention.

Referring to FIG. 16, a process flow diagram illustrating a more detailed description of one exemplary method of making a fiber optic cable 100 wherein deuterium is introduced into the optical fibers 102 prior to the optical fibers 102 being placed in an embedding material 103 or 401, according to the present invention, will now be described. First, as described above, at step 1605 the optical fibers 102 are exposed to deuterium to diffuse a sufficient amount of deuterium so as to achieve, during a subsequent process, a desired level of deuterium reaction at defect sites in the optical fibers 102. Next, at step 1606, the deuterium loaded optical fibers 102 are embedded in an embedding material 103 or 401 to form a UFS 108. Then, at decision step 1607, a decision is made as to whether or not to introduce a fill material 205 which also includes deuterium or the immersion of UFS reel 1005, or UFS 1006, in a deuterium-rich atmosphere. If yes, then at step 1608, the UFS 108 will be surrounded by, for example, strengthening wires or strands 105 and a fill material 201 which has been treated to include additional deuterium; or UFS reel 1005 is placed into a deuterium-rich immersion chamber prior to being introduced into the power conductor making process depicted in FIGS. 10 and 11; or UFS 1006 is fed through an in-line deuterium-rich chamber deployed between UFS reel 1005 and stranding machine 1007. If no, then at step 1609, the UFS 108 will be surrounded by, for example, strengthening wires or strands 105 and a fill material 201 which has not been treated to include deuterium. Similarly, the embedding material 103 might be treated to include deuterium prior to being used to form the UFS 108. In any case, subsequently the fiber optic cable 100 is completed as an unarmored cable at steps 1608 and 1609, and may be completed as an armored cable by completing steps 1611–1612.

Figure 17:
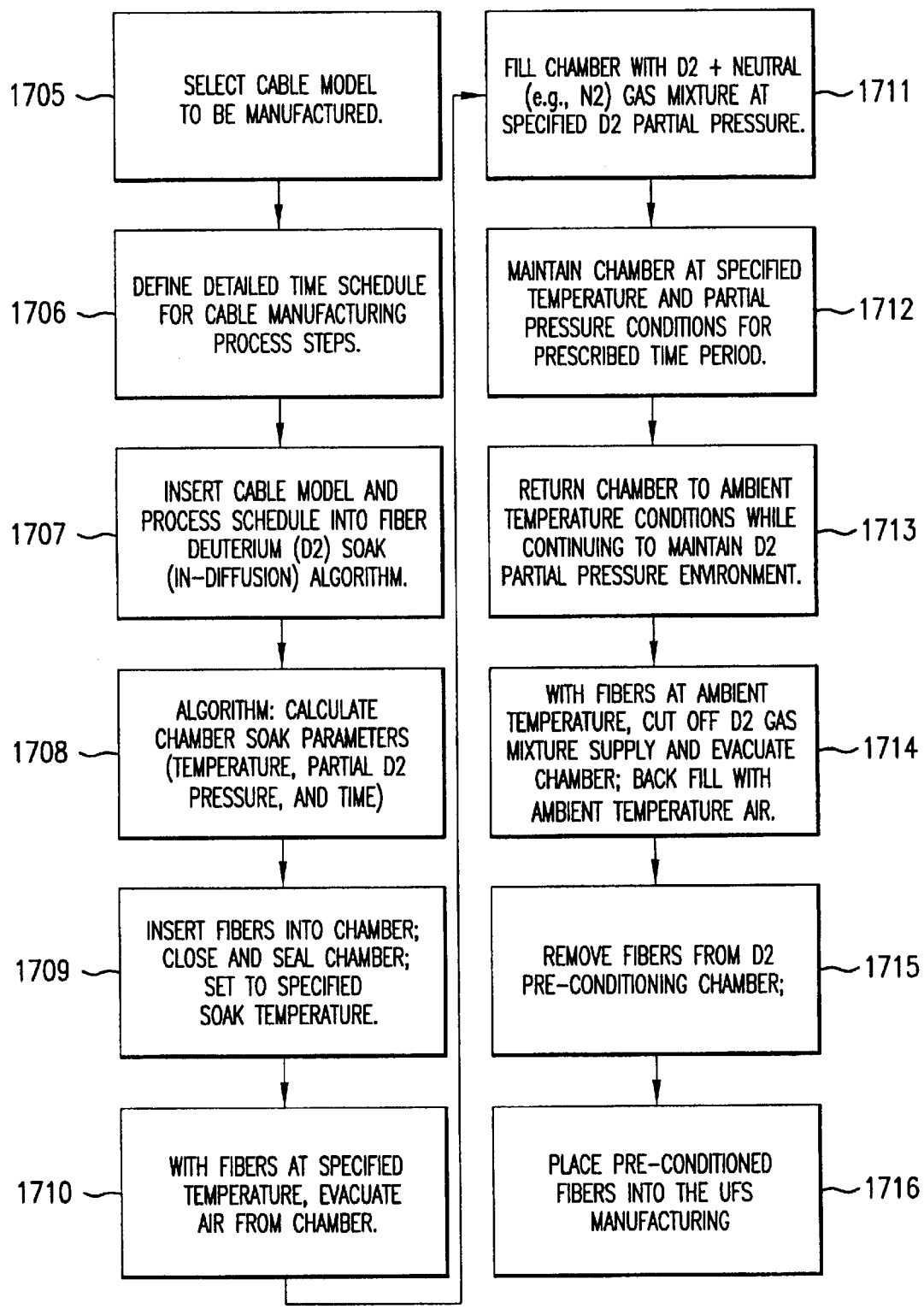
FIG. 17 is a process flow diagram illustrating a more detail description of a portion of the preferred method provided in FIG. 16 of making a fiber optic cable according to the present invention.

Referring now to FIG. 17, is a process flow diagram illustrating a more detailed description of the an exemplary process which may be used for step 1605 in the preferred method provided in FIG. 16 of making a fiber optic cable 100 according to the present invention will now be explained. First, at step 1705, the particular cable model to be built is selected. The selection of the type of fiber optic cable 100 to be built may effect the process parameters used in exposing the optical fibers 102 to deuterium. Next, at step 1706, a detailed time schedule is defined for the cable manufacturing process steps. Then, at step 1707, the cable model and process schedule is provided to determine the deuterium immersion parameters (partial pressure, temperature, and immersion time). At step 1708 the chamber soak parameters such as temperature, partial $D_2$ pressure, and time are calculated. Then, at step 1709, optical fibers 102 are inserted into a chamber and the chamber is set at the predetermined temperature. At step 1710, air is evacuated from the chamber while maintaining chamber temperature. Next, at step 1711, the chamber is filled with deuterium gas and an inert or neutral gas such as nitrogen ($N_2$) at a predetermined $D_2$ partial pressure. Then, at step 1712, the fiber chamber is maintained at a specified temperature and partial pressure for a prescribed period of time. At step 1713, once the time has expired, the chamber is returned to ambient temperature conditions while the partial $D_2$ pressure is maintained. Next, at step 1714, the deuterium gas is turned off and remaining deuterium, or deuterium plus neutral, gas is evacuated from the soak chamber, and the chamber is back-filled with ambient air at ambient temperature. Then, at step 1715, the optical fibers 102 are removed from the pre-conditioning soak, or immersion, chamber. The preconditioned optical fibers 1716 are then introduced into the UFS 108 assembly process at step 1716 (step 1606). Many candidate UFS manufacturing processes are characterized by a high temperature environment. The high temperature UFS processes will, in general, create conditions for reacting the fiber defect sites with the deuterium that has been previously diffused into the fibers via steps 1709 through 1714. During this high temperature UFS manufacturing process environment some of the previously in-diffused deuterium may out-diffuse from the fibers; however, the out-diffusion is anticipated, and in steps 1707 and 1708, may be compensated for by prescribing the proper amount of deuterium loading in anticipation of deuterium losses.

Although various preferred embodiments for deuterium introduction and reaction have been described (e.g., the loading of the fill material during the power conductor phase of cable manufacture and the loading of the fibers prior to UFS manufacture), one will understand that any method or manner of exposing the prefabricated cabled optical fibers or other constituent cable components to deuterium prior to introduction into the fiber optic cable 100 may be used. For example, deuterium could be included in some material which is applied over the acrylate surface of the fiber coatings that typically surround the silica, and then overclad with a low permeability coating in order to ensure that sufficient deuterium remains sufficiently entrapped so that some of the deuterium diffuses into the core regions of optical fibers 102 prior to introduction into the fiber optic cable assembly process. Alternatively, a deuterium exposure chamber could be placed within the UFS 108 assembly line and the optical fibers 102 may be fed through the chamber prior to being encased in the fiber optic cable 100. In another alternative, the UFS reel 1005 and its included UFS payload 1006 can be immersed in a deuterium-rich environment prior to being fed through the process depicted in FIG. 10. Or an in-line UFS 1006 deuterium soak chamber can be used in FIG. 10 between the payout reel 1005 and wire package forming line. Further, the set-up depicted in FIG. 11 can be modified to include a needle-like deuterium payout nozzle located in the annular region between the wire-encased UFS 1013 and the oversized copper sheath, with the deuterium supply tube for the nozzle passing through the opening at the copper strip edges prior to these edges been fully closed being brought into butting contact for the formation of the over-sized circular cross-section cylinder.

In any case, in those embodiments that require that the deuterium reaction take place within the confines of sheath 106, as opposed to taking place during the UFS manufacturing process, once deuterium is introduced into a material used somewhere in the construction of the fiber optic cable 100, a material which slows, reduces, or resists the rate of deuterium egress may be used to ensure retention and diffusion of some of the deuterium into the doped silica core regions of the optical fibers embedded within the cable. For example, in at least one embodiment described above a copper sheath, used as the containment cylinder or sheath 106, is welded at its seam and thus creates a hermetic or semi-hermetic seal. This containment cylinder or sheath 106 will provide a sufficient deuterium retention barrier to ensure retention, diffusion, and reaction of at least some of the deuterium in the optical fibers 102. In any case, during the cabling process and over time the deuterium retained within the fiber optic cable 100 will react and combine with the defect sites in the optical fibers 102 so that ordinary hydrogen has a low probability of reacting at those same defect sites, thereby improving the stability of the long term attenuation characteristics of the optical fibers 102 and fiber optic cable 100.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, the present invention is applicable to any fiber optic cable design in which life time hydrogen degradation may be a concern.

The invention applies to fiber optic cables made with any material susceptible to hydrogen degradation, such as fibers made from silica and dopants that are known to create stratified refractive index profiles that are required to confine and guide optical signals within the fiber, examples of which include, but are not limited to, germanium-based, phosphorous-based, and fluorine-based compounds.

Further, the invention is not limited to the introduction of deuterium but includes the use of any substance which will attach to the defect sites within the optical fibers and operate to prevent, or inhibit, hydrogen from reacting with the defect site, while itself not causing undesirable life time signal degradation. The invention is also applicable to other optical fiber based devices, such as optical amplifiers (for example, those based upon erbium-doped fiber technology), optical couplers, optical filters, or splitters, which may be susceptible to hydrogen induced aging degradation. In these other applications, a deuterium-rich atmosphere may be introduced in sealed repeater housings, amplifier housings, and apparatus cases that contains these components. Here, again, the deuterium will diffuse into the components and react with defect sites associated with these components, thereby diminishing the probability that these same defect sites will later suffer unfavorable reactions with ordinary hydrogen. Once again, we may choose to use the product itself as the reaction chamber; in the case of fiber optic components installed within a repeater, the repeater housing serves as the reaction chamber.

All publications, patents, and patent applications cited herein are hereby incorporated by reference in their entirety for all purposes.

What is claimed is:

1. An optical fiber cable, comprising:

an optical fiber encapsulated within said optical fiber cable; and a material including deuterium which will react at defect sites within said optical fiber and reduce the number of defect sites available for reaction with hydrogen; wherein said material is introduced during encapsulation of said optical fiber into said optical fiber cable.

2. The optical fiber of claim 1, wherein said material fills areas which would otherwise be voids and provides water blocking.

3. The optical fiber cable of claim 2, wherein said optical fiber is made of a material including silicon.

4. The optical fiber cable of claim 3, wherein said optical fiber includes dopants that are designed to provide a specified refractive profile.

5. The optical fiber cable of claim 1, further comprising a layer that slows the egress rate of said deuterium so that at least a portion of said deuterium will diffuse into said optical fiber.

* * * * *